United States Patent
Pietkiewicz

(10) Patent No.: US 8,698,584 B2
(45) Date of Patent: Apr. 15, 2014

(54) INTEGRATED MAGNETIC DEVICE FOR LOW HARMONICS THREE-PHASE FRONT-END

(71) Applicant: Schaffner EMV AG, Luterbach (CH)

(72) Inventor: Andrzej Pietkiewicz, Bern (CH)

(73) Assignee: Schaffner EMV AG, Luterbach (CH)

( * ) Notice: Subject to any disclaimer, the term of this patent is extended or adjusted under 35 U.S.C. 154(b) by 1 day.

(21) Appl. No.: 13/667,916

(22) Filed: Nov. 2, 2012

(65) Prior Publication Data

US 2013/0141200 A1 Jun. 6, 2013

Related U.S. Application Data

(63) Continuation of application No. PCT/EP2011/059414, filed on Jun. 7, 2011.

(30) Foreign Application Priority Data

Jun. 10, 2010 (WO) ................ PCT/EP2010/058157
Jun. 18, 2010 (WO) ................ PCT/EP2010/058669

(51) Int. Cl.
| | | |
|---|---|---|
| H01F 30/12 | (2006.01) | |
| H01F 27/24 | (2006.01) | |
| H01F 27/28 | (2006.01) | |
| H02M 7/515 | (2007.01) | |
| H02M 7/06 | (2006.01) | |
| H02M 5/10 | (2006.01) | |

(52) U.S. Cl.
USPC ............... 336/5; 336/12; 336/212; 336/222; 363/2; 363/4; 363/5; 363/126; 363/153

(58) Field of Classification Search
USPC ............ 336/5, 12, 212, 222; 363/2, 4, 5, 126, 363/153
See application file for complete search history.

(56) References Cited

U.S. PATENT DOCUMENTS

| | | | | |
|---|---|---|---|---|
| 3,531,708 A | * | 9/1970 | Kuba ................................. | 363/2 |
| 4,206,434 A | * | 6/1980 | Hase ................................. | 336/5 |
| 4,779,181 A | | 10/1988 | Traver et al. | |
| 4,876,634 A | | 10/1989 | Paice | |
| 5,124,904 A | | 6/1992 | Paice | |
| 5,182,535 A | * | 1/1993 | Dhyanchand .................... | 336/12 |
| 5,619,407 A | * | 4/1997 | Hammond .................... | 363/155 |

(Continued)

FOREIGN PATENT DOCUMENTS

| | | |
|---|---|---|
| DE | 3826524 A1 | 3/1989 |
| EP | 1385258 A1 | 1/2004 |

(Continued)

*Primary Examiner* — Tsz Chan
(74) *Attorney, Agent, or Firm* — Blank Rome LLP

(57) ABSTRACT

An integrated magnetic device for low harmonics three-phase front-end (1) comprising three magnetic sub-assemblies (30), wherein each magnetic sub-assembly (30) comprises a magnetic core without air-gaps, three or more wound limbs and at least five windings, three current inputs connectable to a three-phase power grid (100), at least nine current outputs, three for each current inputs, said current outputs being galvanically connected to said three current inputs and connectable to a load (200).

The integrated magnetic device is designed for a low harmonics three-phase bidirectional front-end and also for AC/DC rectifier and DC/AC power inverters. Its use enables reduction of the harmonics of the currents absorbed or injected to three-phase power line by using only one device which integrates a splitter and an inductor function. Compared to known solutions, cost, material and dimensions of the integrated magnetic device are reduced.

13 Claims, 56 Drawing Sheets

(56) References Cited

U.S. PATENT DOCUMENTS

| | | |
|---|---|---|
| 6,198,647 B1 | 3/2001 | Zhou et al. |
| 6,249,443 B1 * | 6/2001 | Zhou et al. ............. 363/5 |
| 6,335,872 B1 * | 1/2002 | Zhou et al. ............. 363/154 |
| 7,005,840 B2 | 2/2006 | Cester |
| 7,142,081 B1 * | 11/2006 | Shudarek ............. 336/178 |
| 7,902,956 B2 | 3/2011 | Sodo |
| 2003/0206087 A1 | 11/2003 | Raff |
| 2005/0077886 A1 | 4/2005 | Cester |
| 2009/0140829 A1 | 6/2009 | Sodo |

FOREIGN PATENT DOCUMENTS

| | | |
|---|---|---|
| EP | 2068430 A2 | 6/2009 |
| JP | 2000358372 A | 12/2000 |
| JP | 2007028846 A | 2/2007 |
| WO | WO-9819385 A1 | 5/1998 |

\* cited by examiner

PRIOR ART
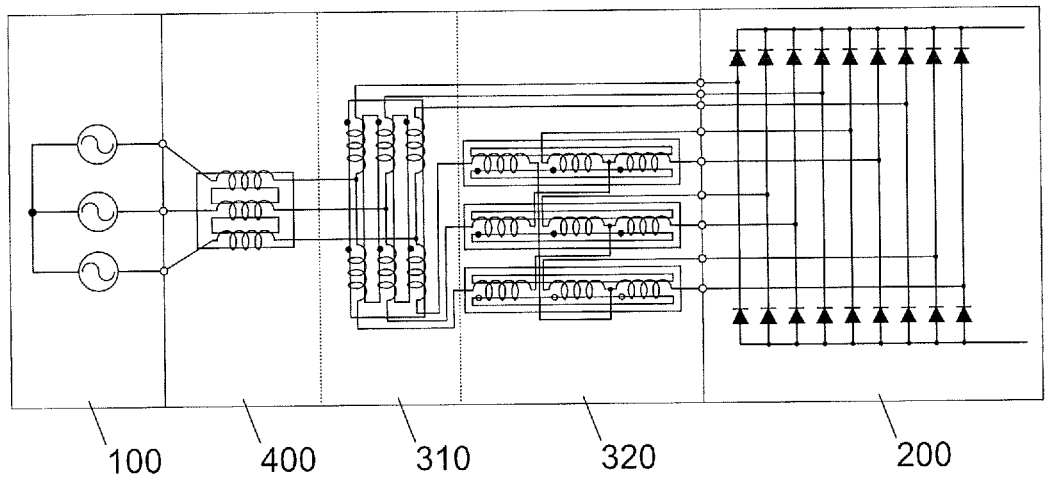
Fig.1A
PRIOR ART
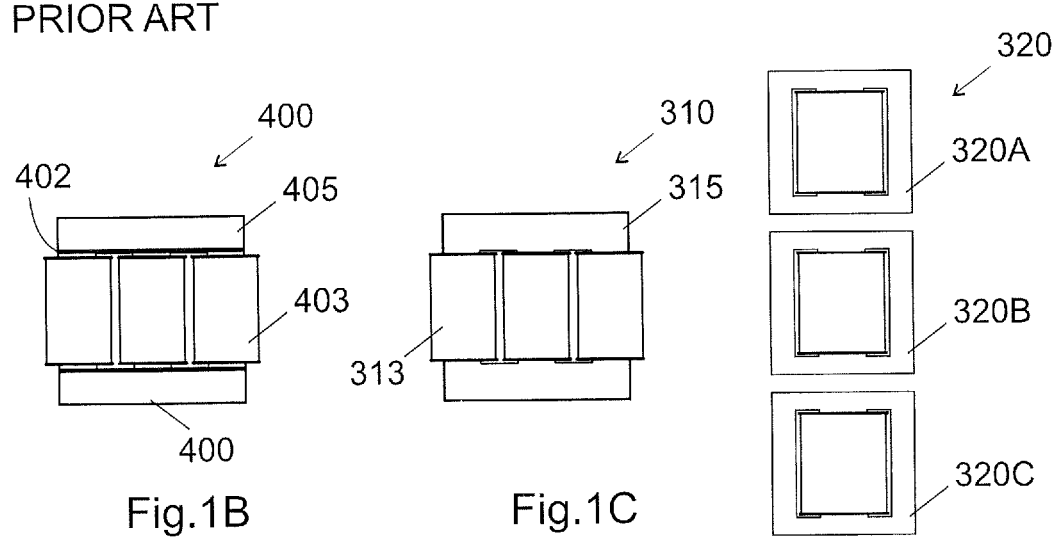
Fig.1B   Fig.1C
Fig.1D

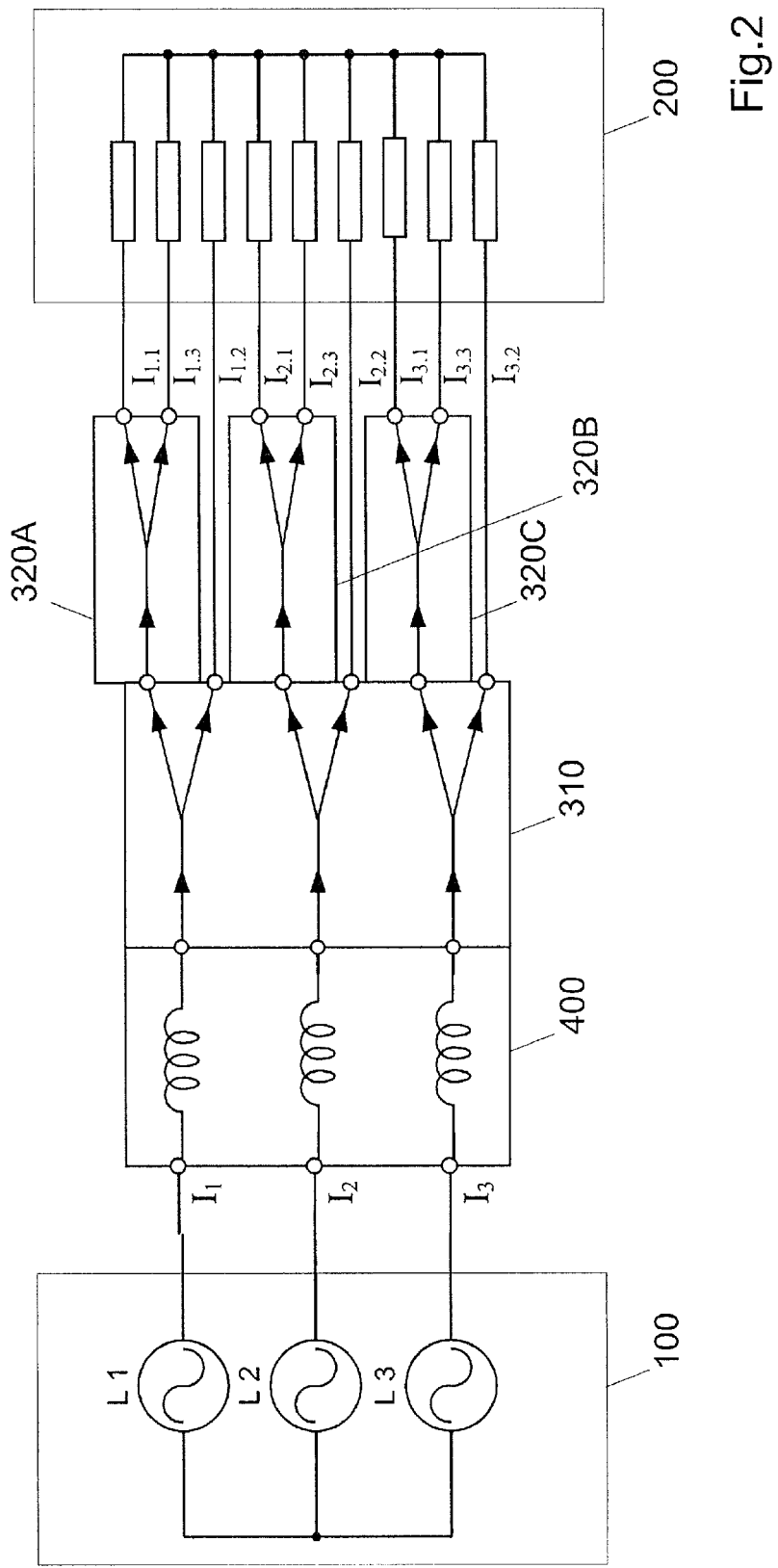

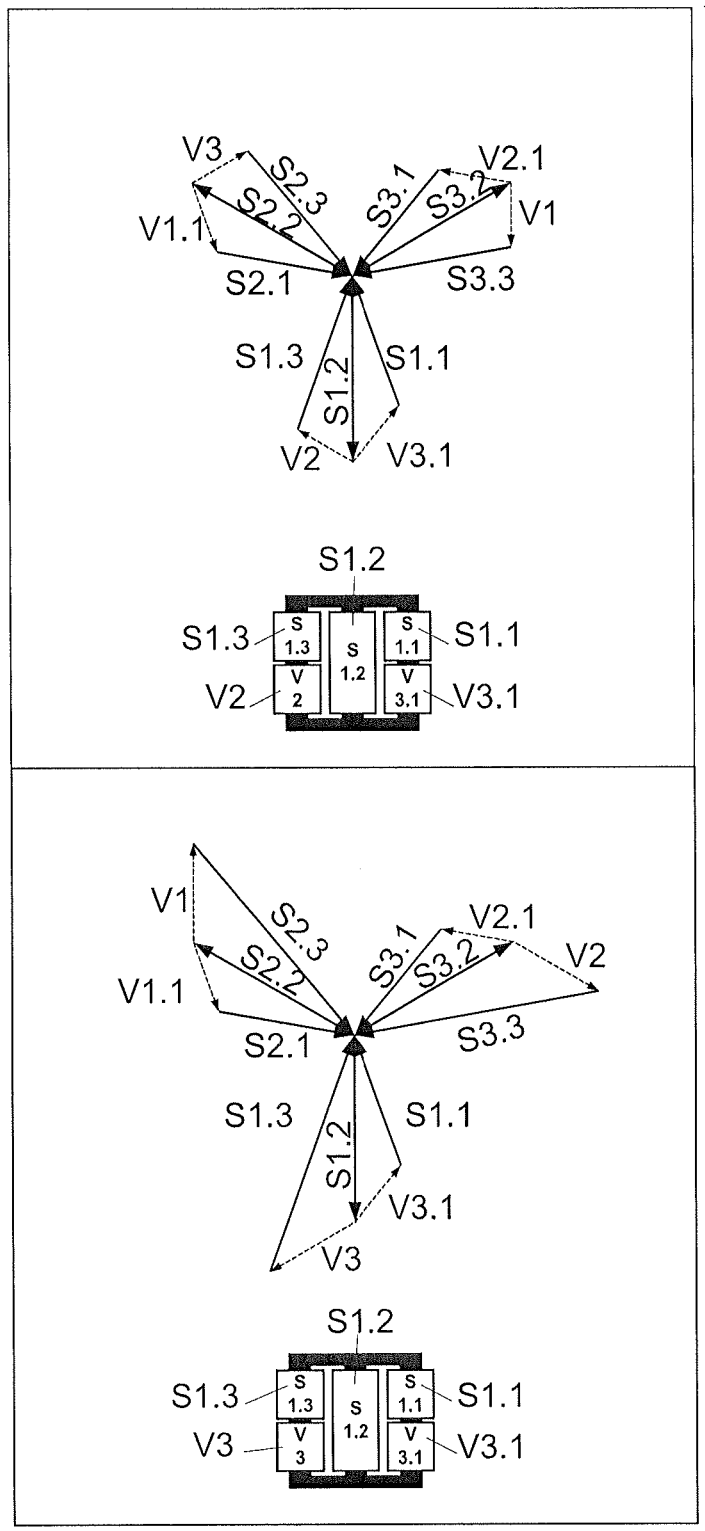
Fig.7B1

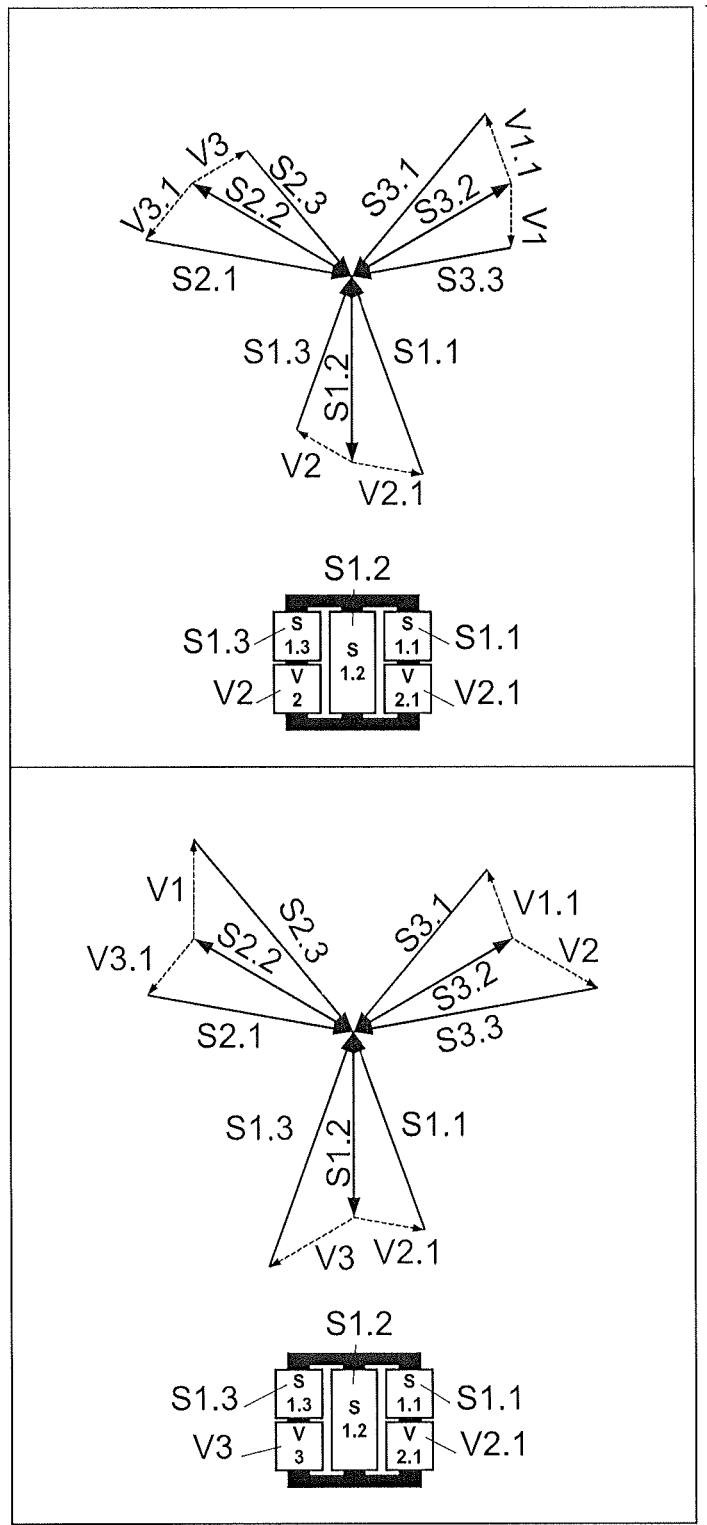
Fig.7B2

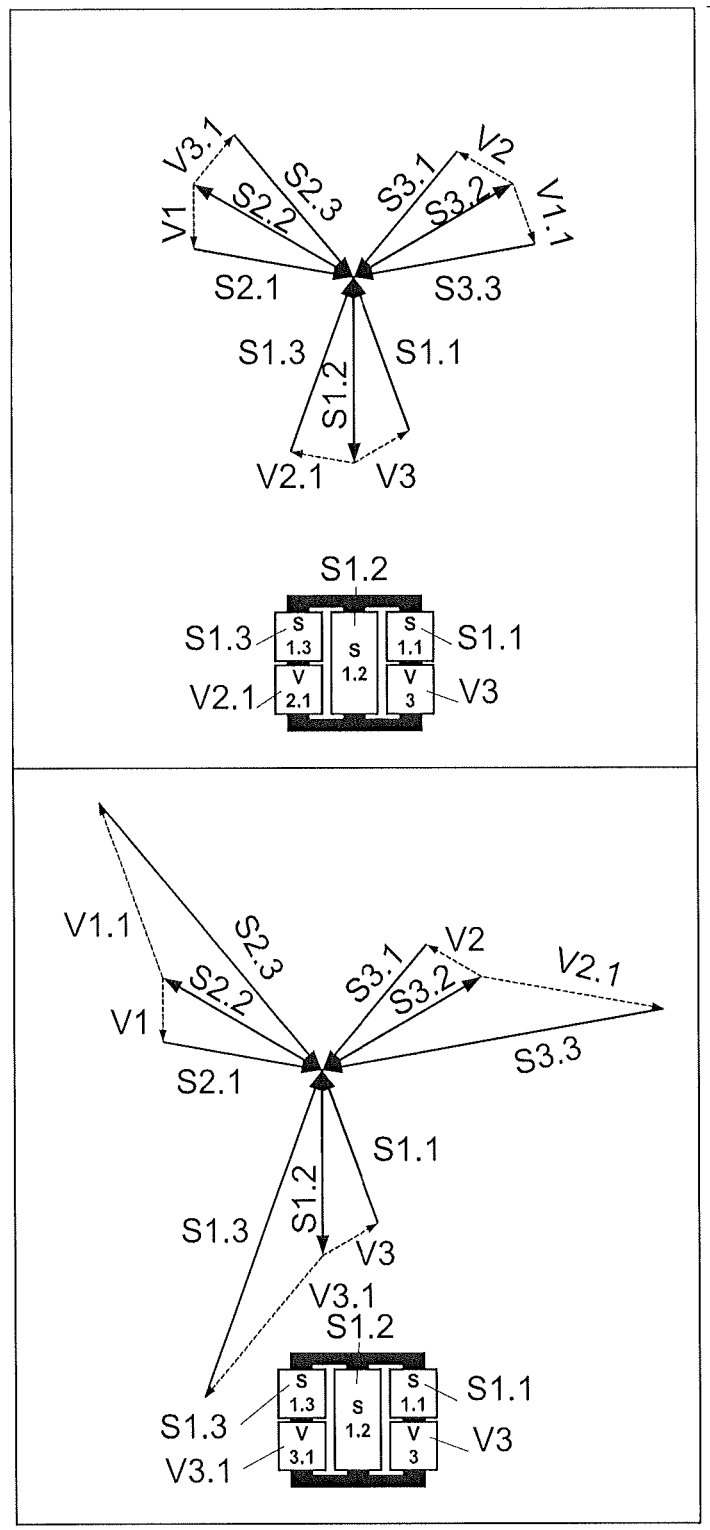
Fig.7B3

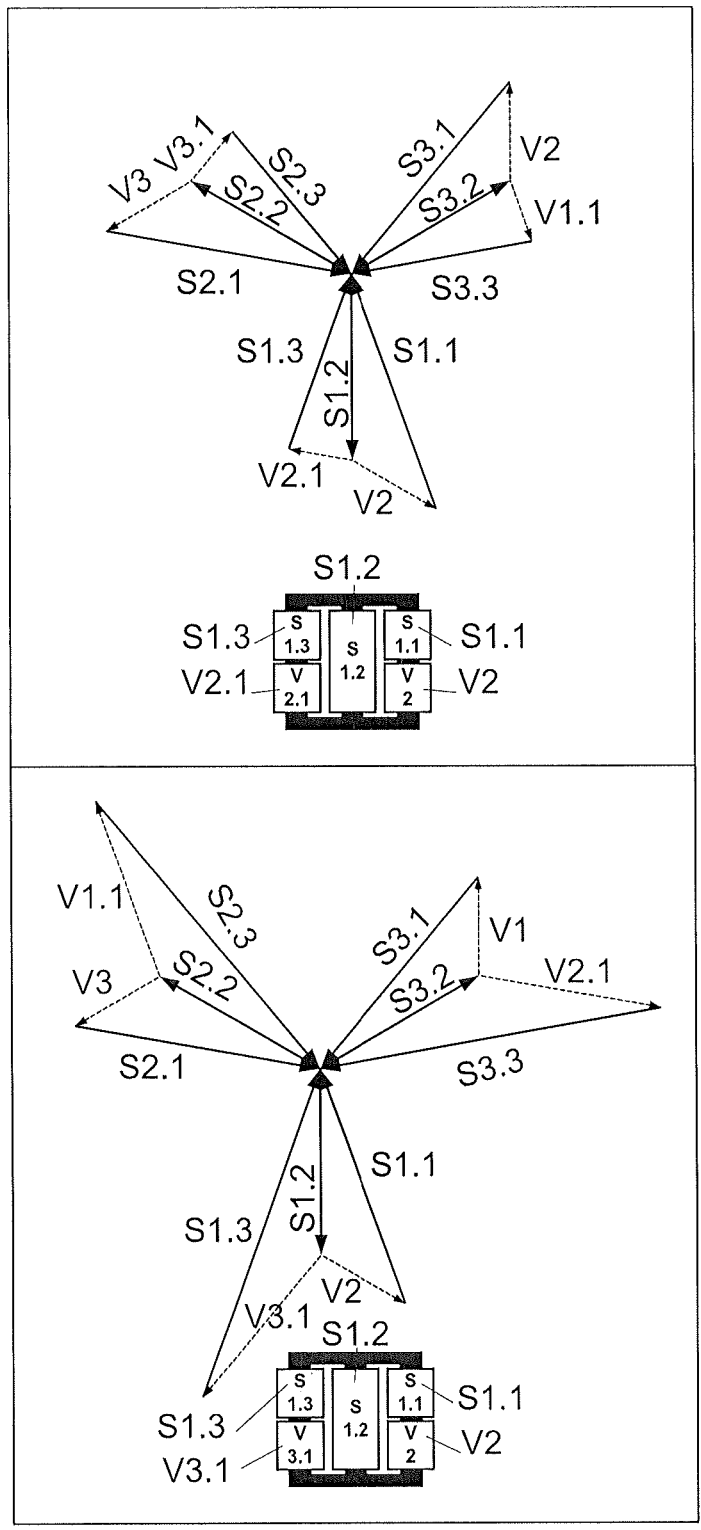
Fig.7B4

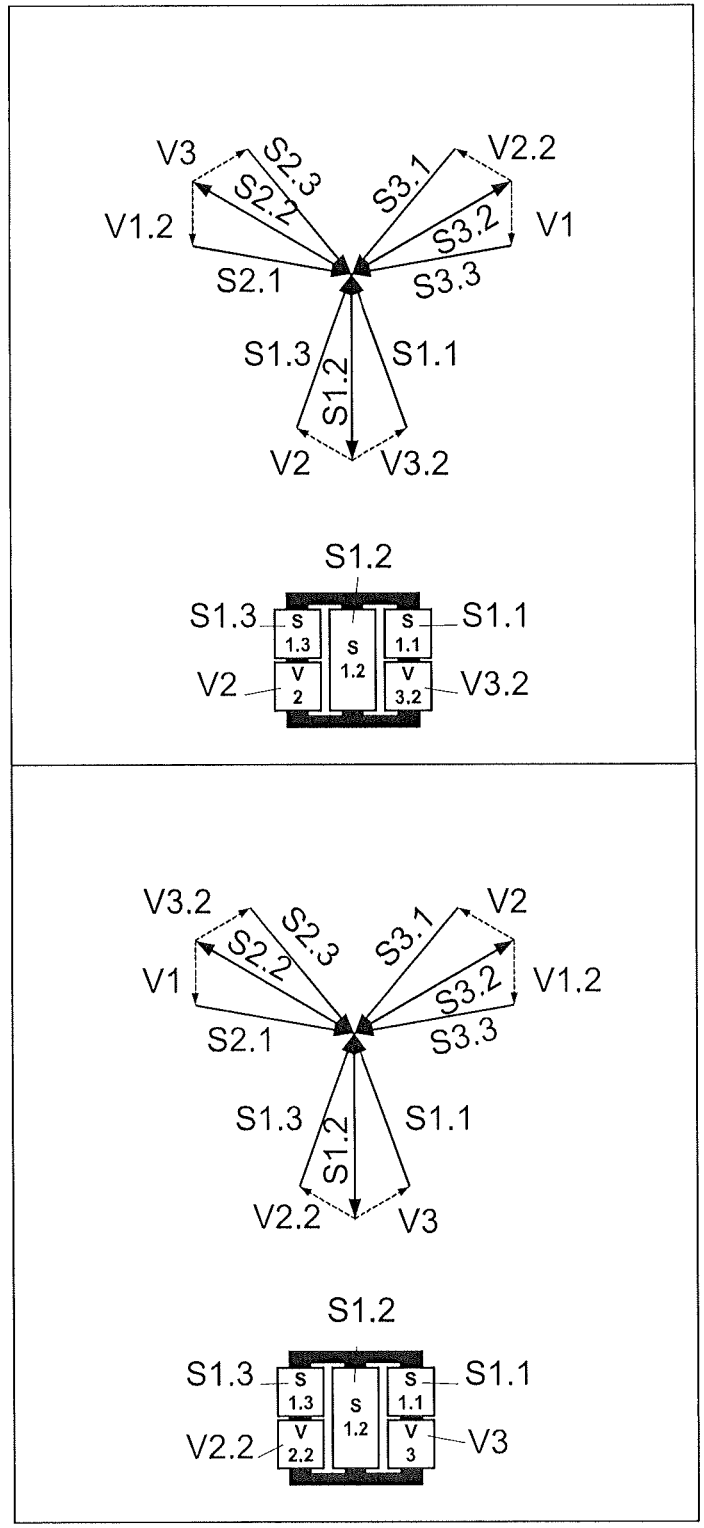
Fig.8B1

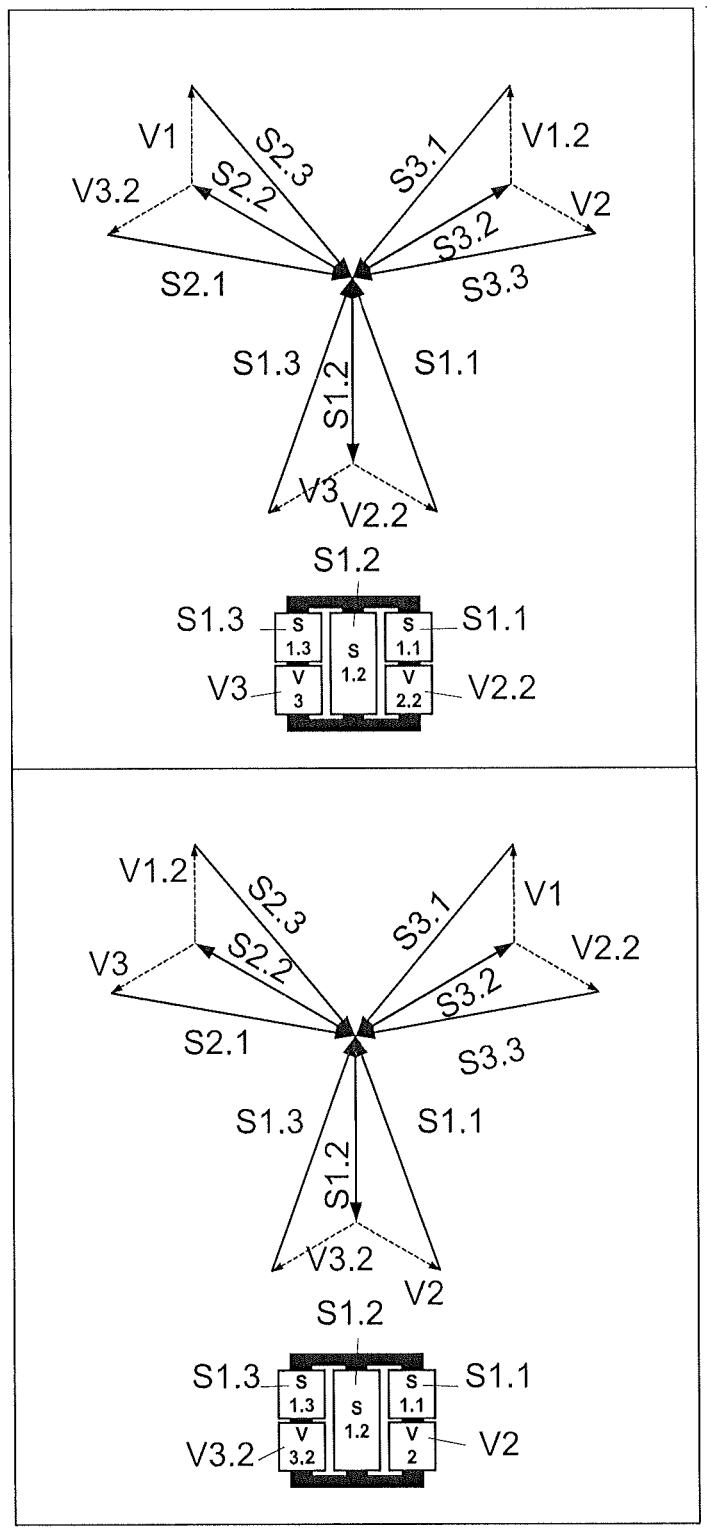
Fig.8B2

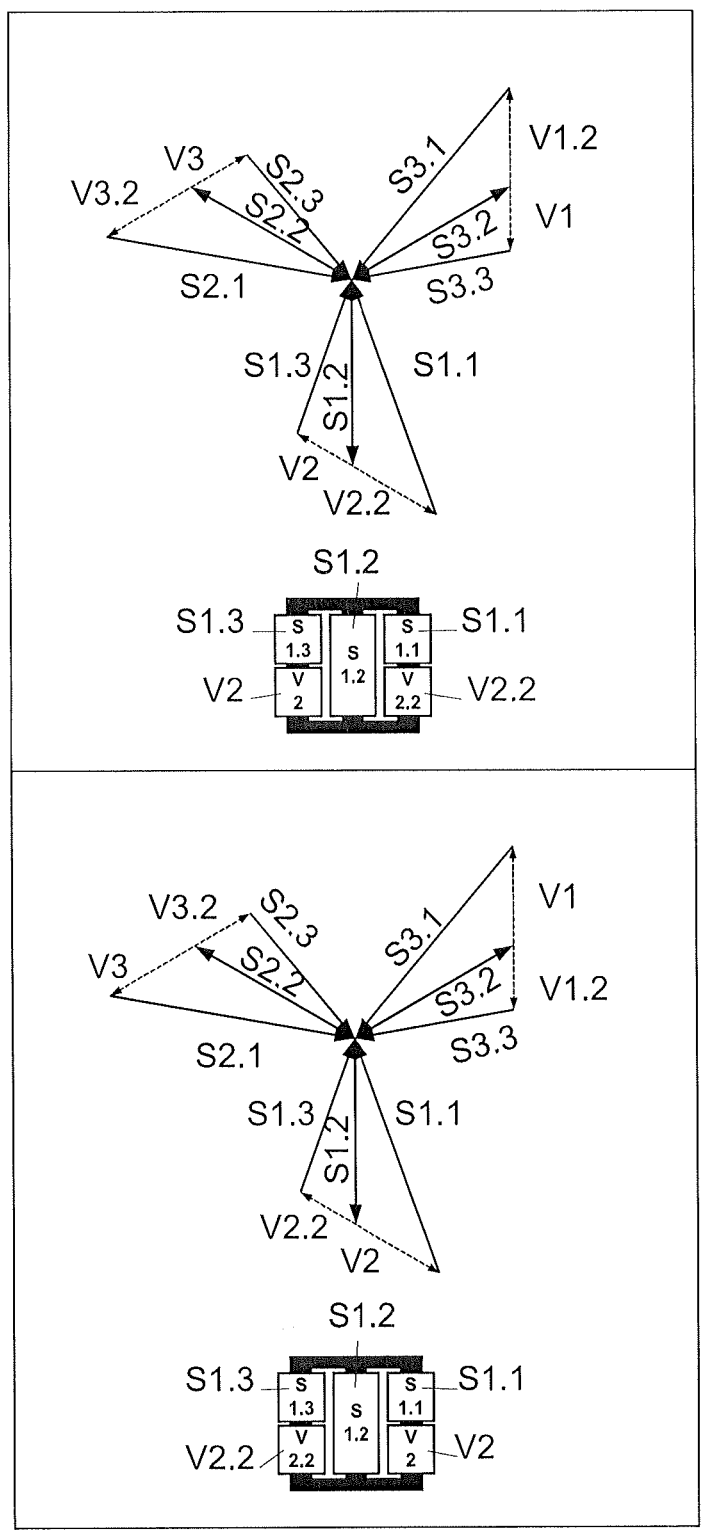
Fig.8B3

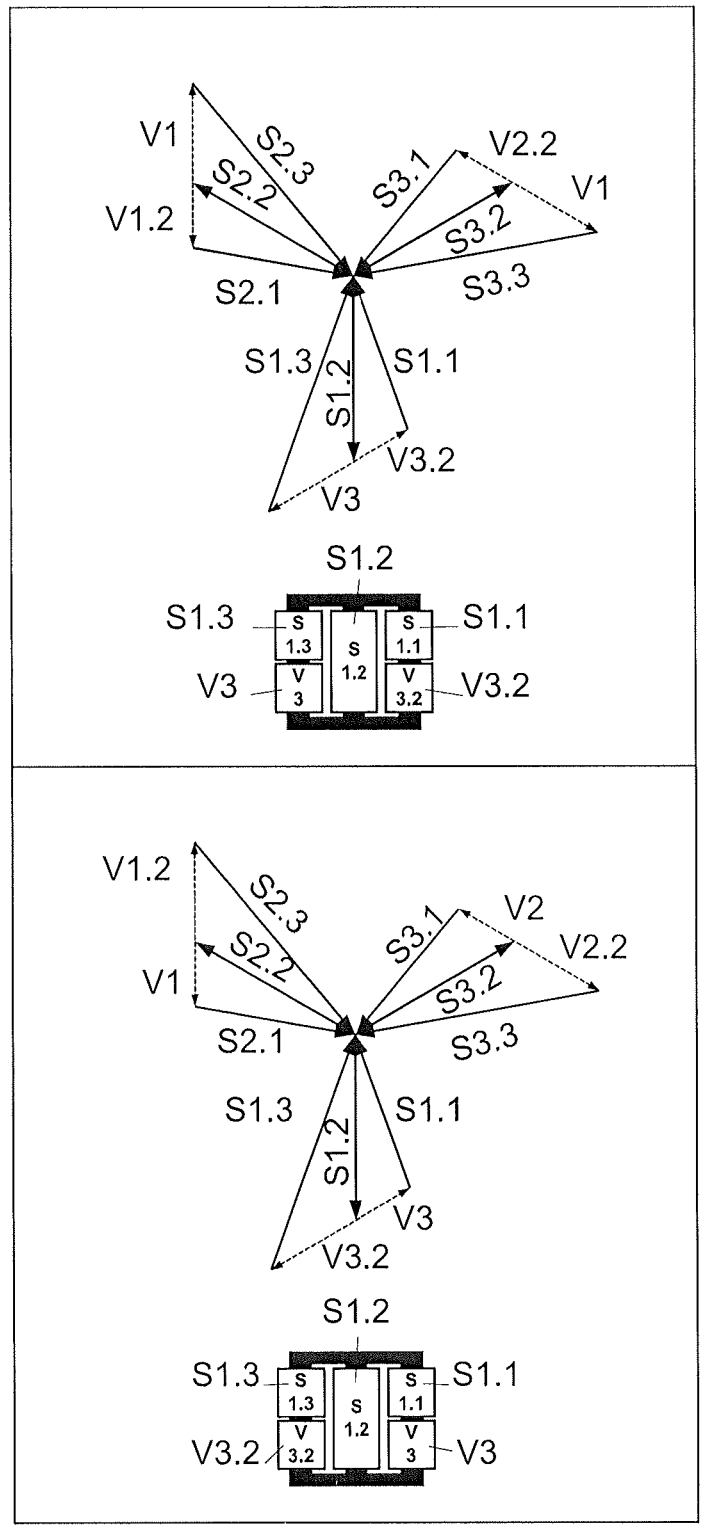
Fig.8B4

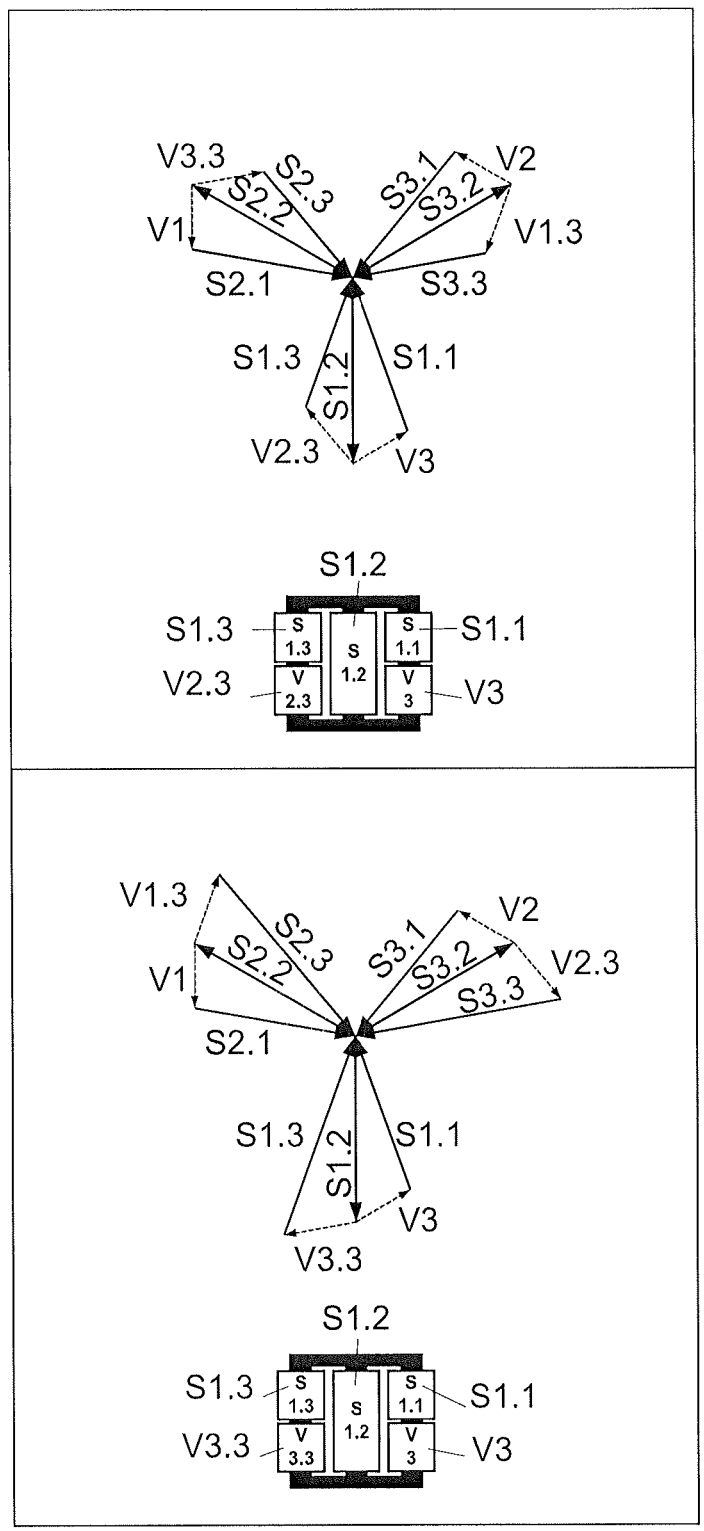
Fig.9B1

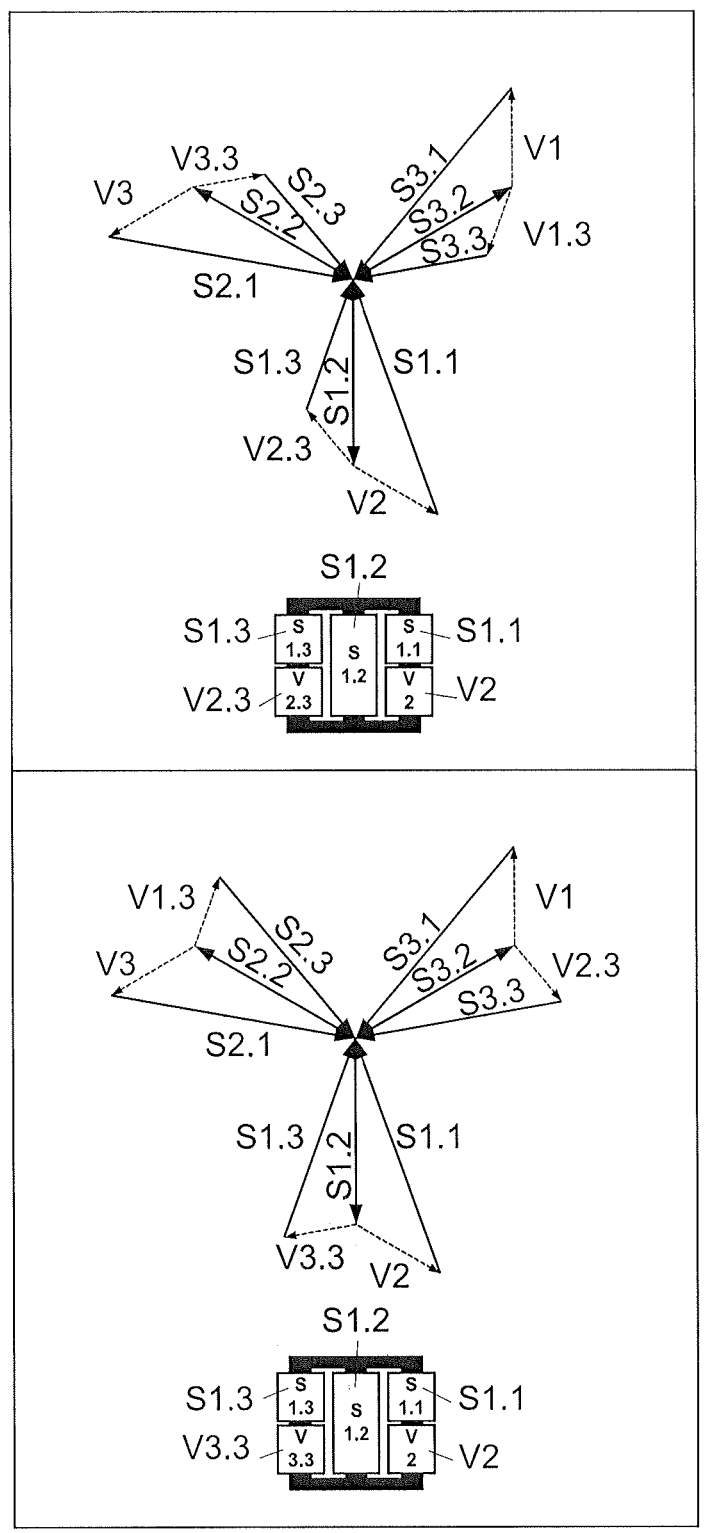
Fig.9B2

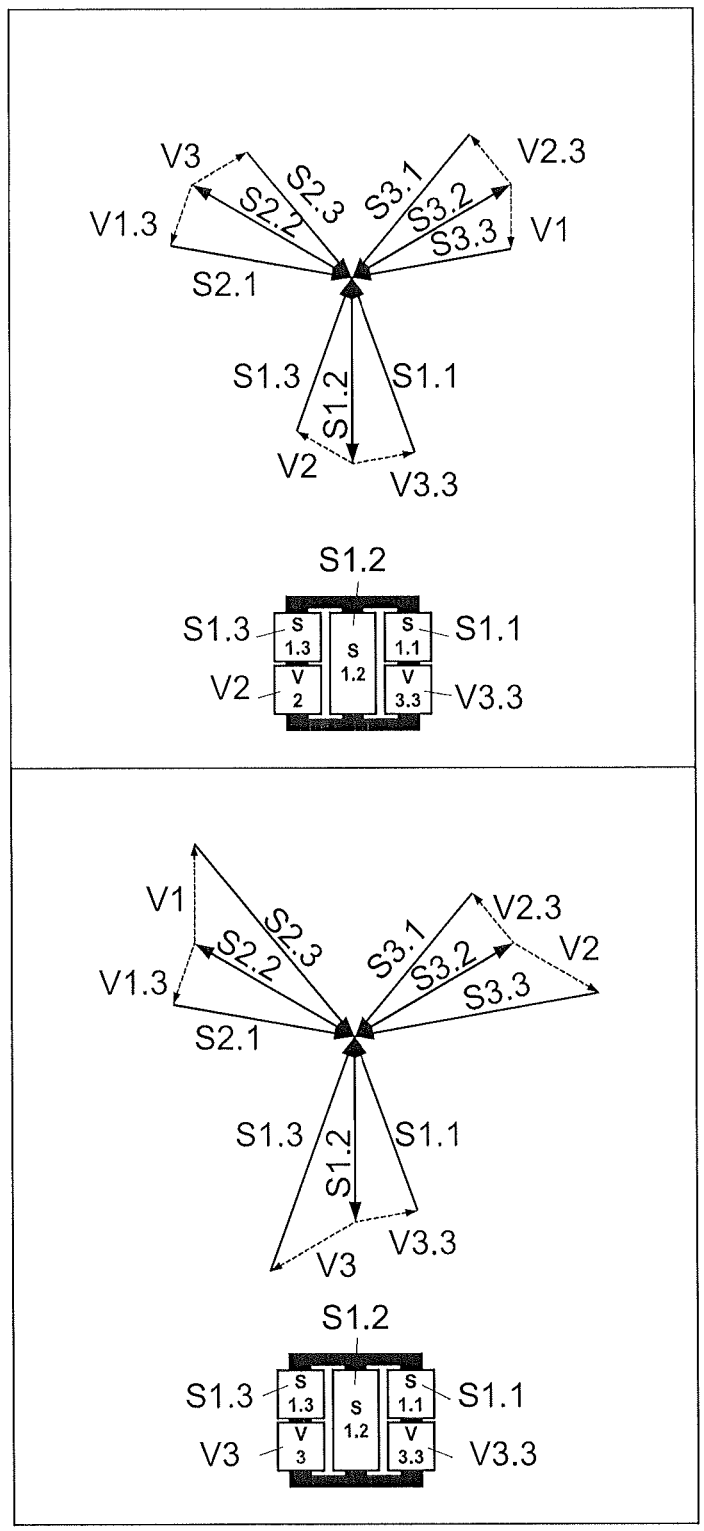
Fig.9B3

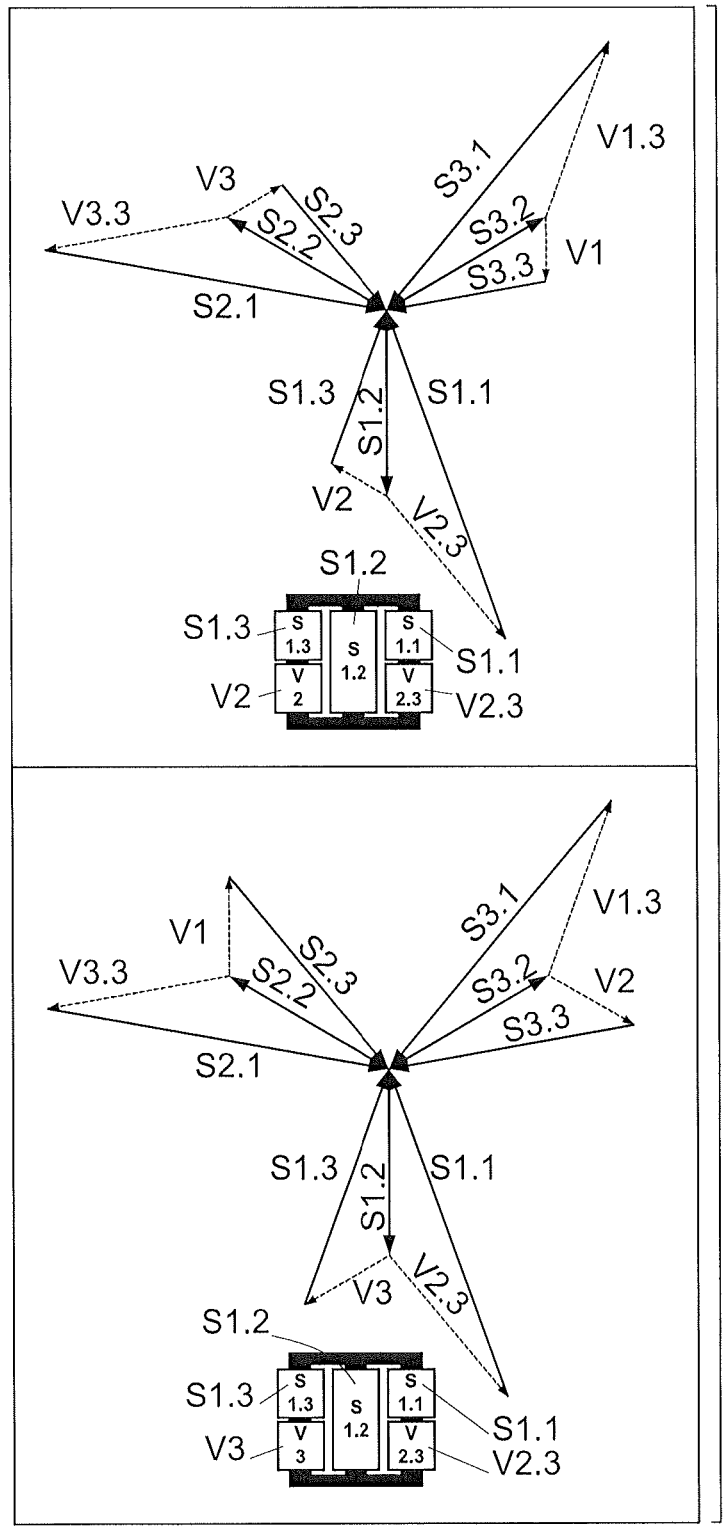
Fig.9B4

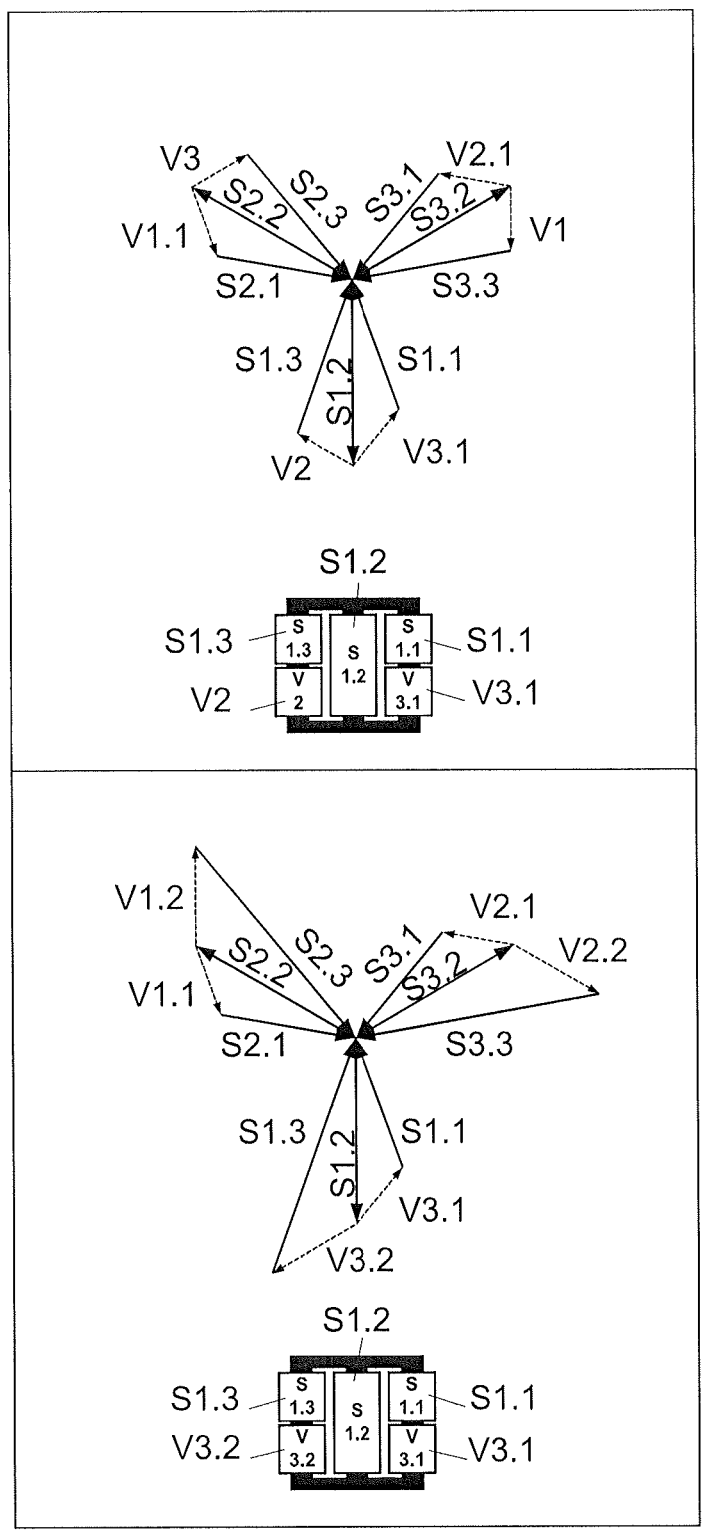
Fig.10B1

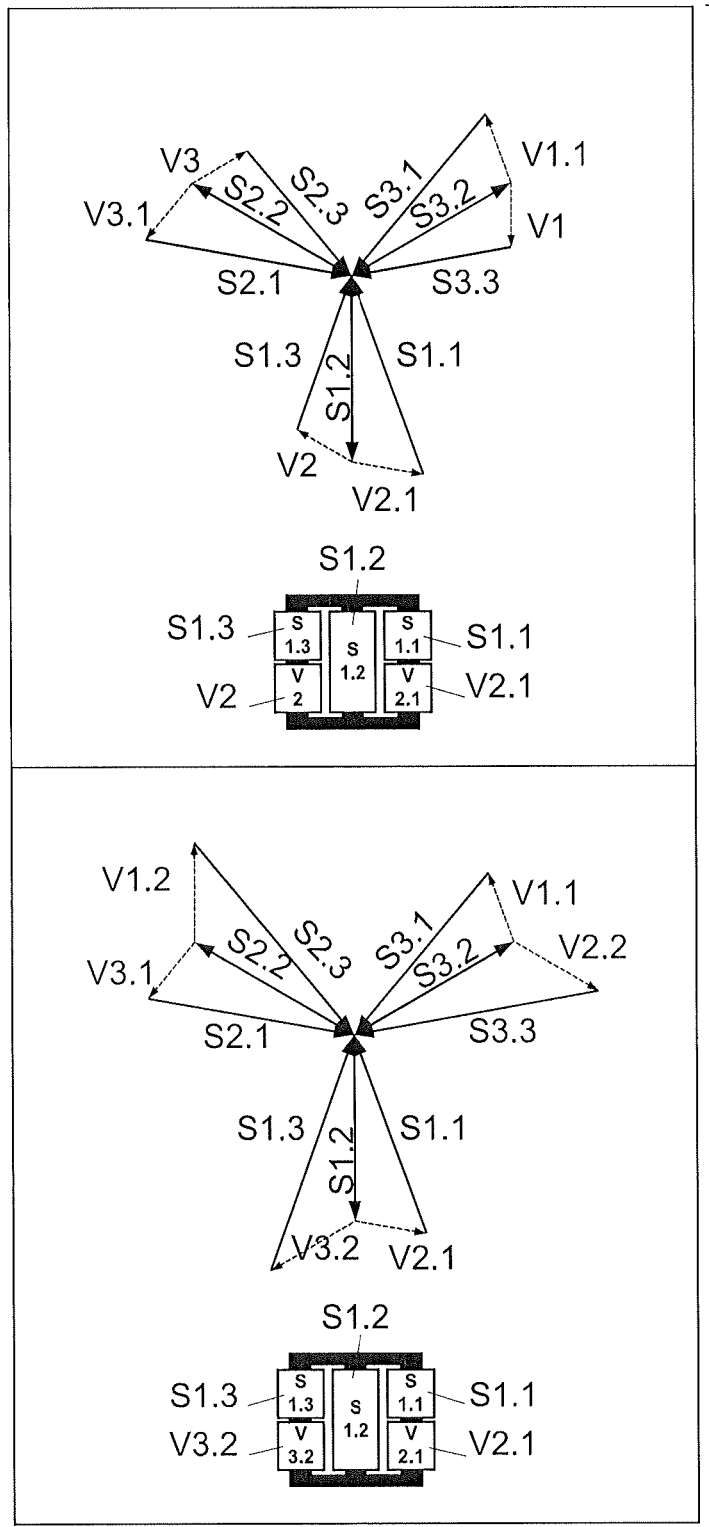
Fig.10B2

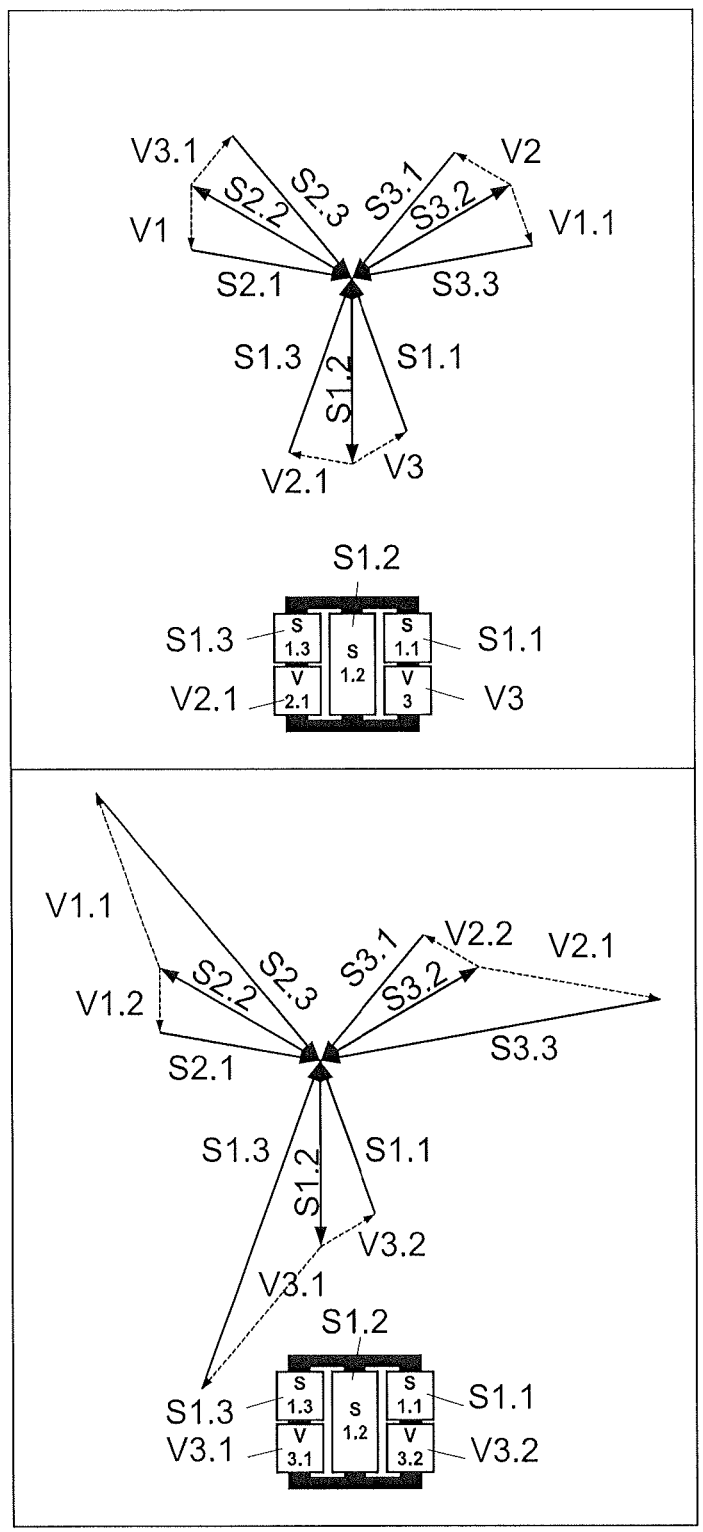
Fig.10B3

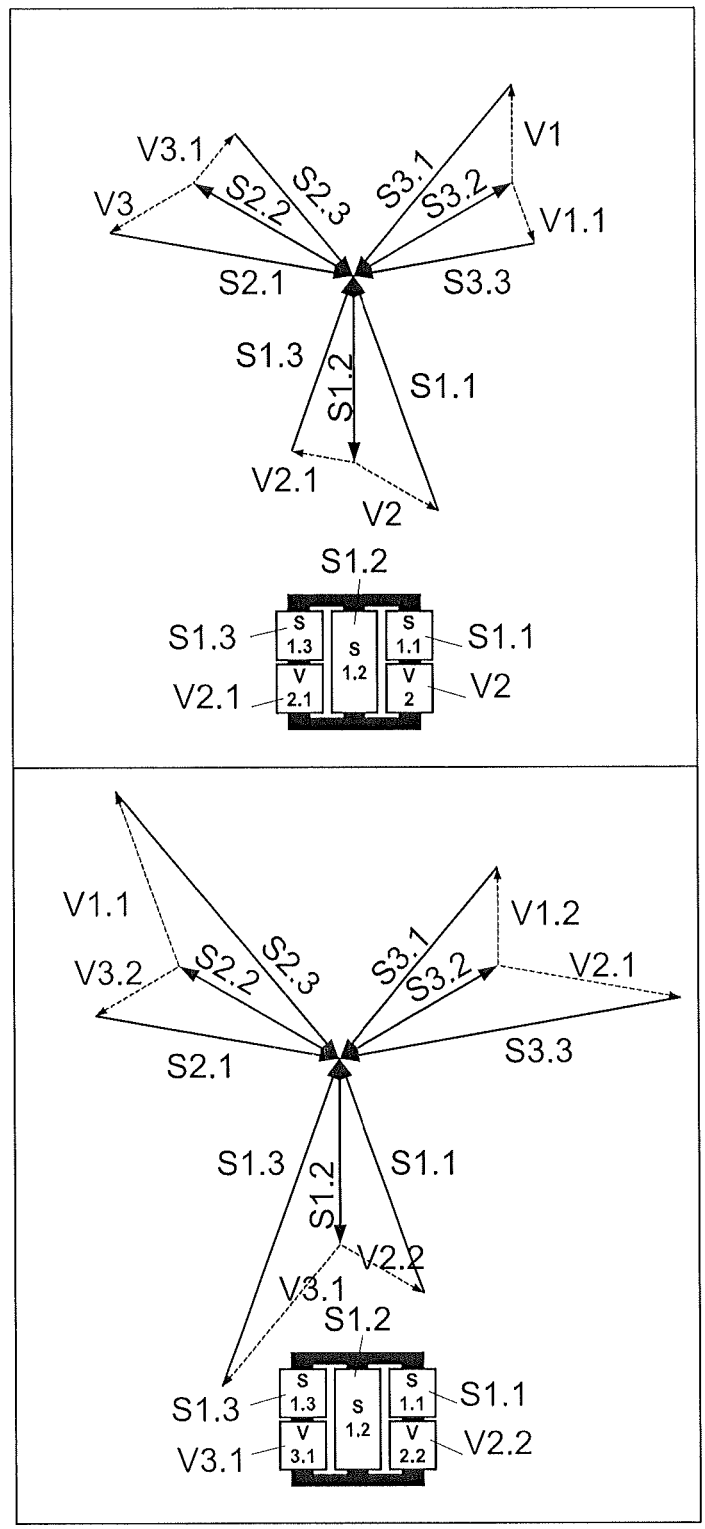
Fig.10B4

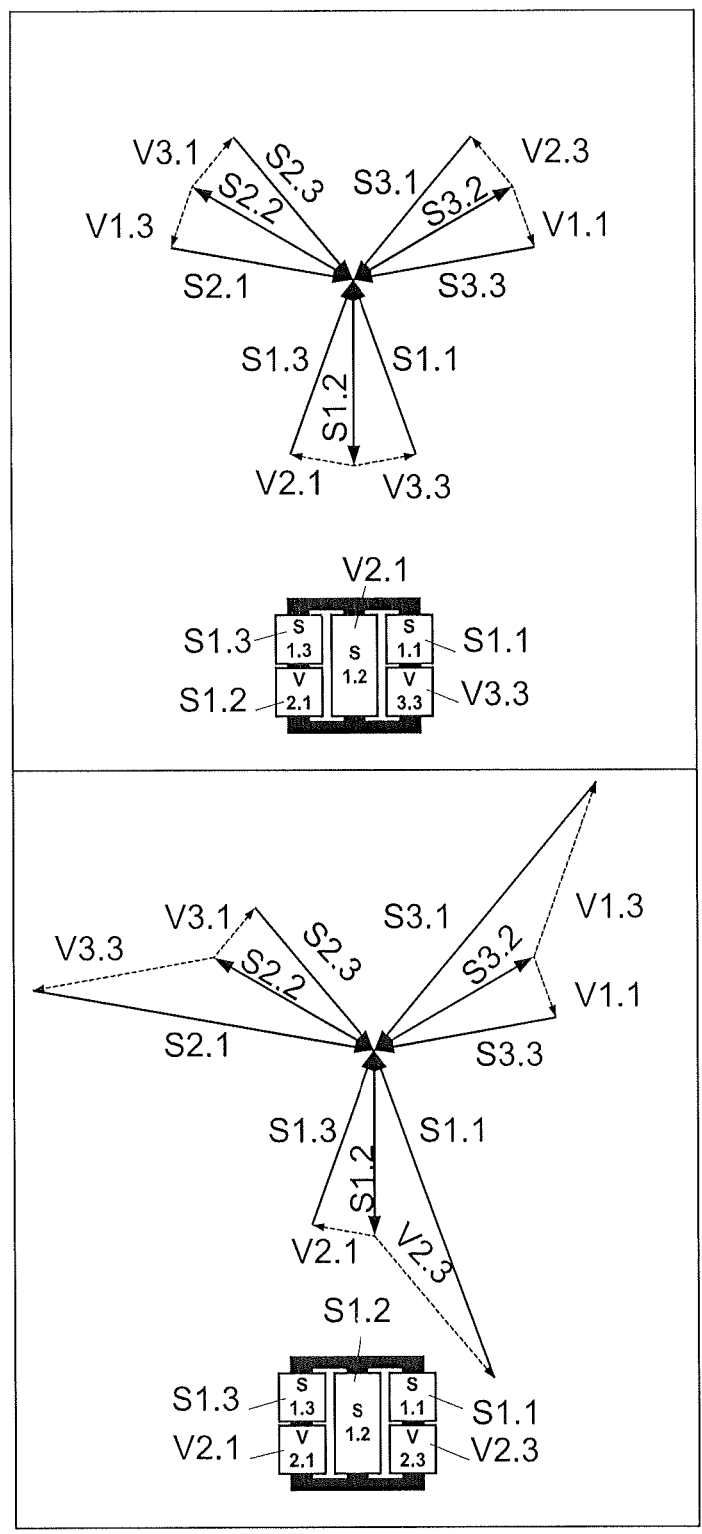
Fig.11B1

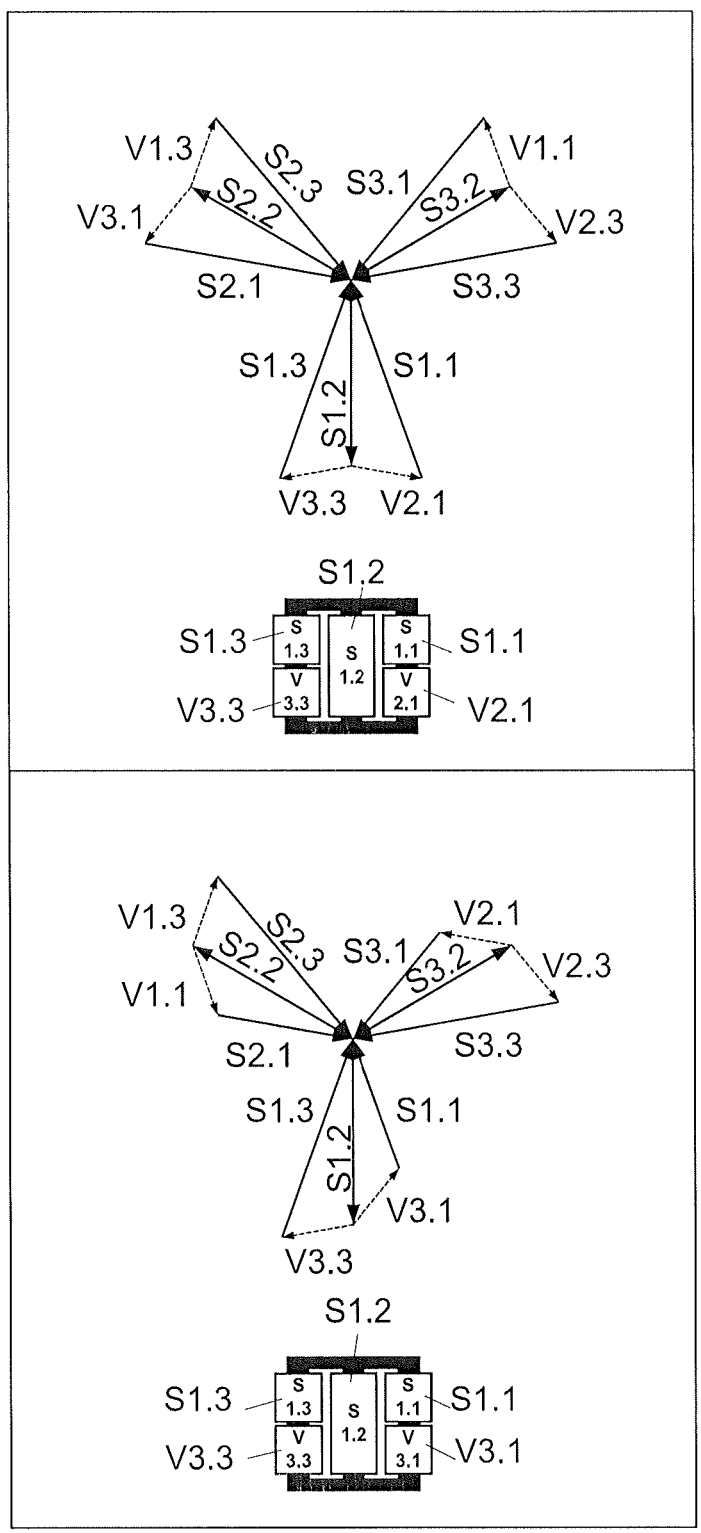
Fig.11B2

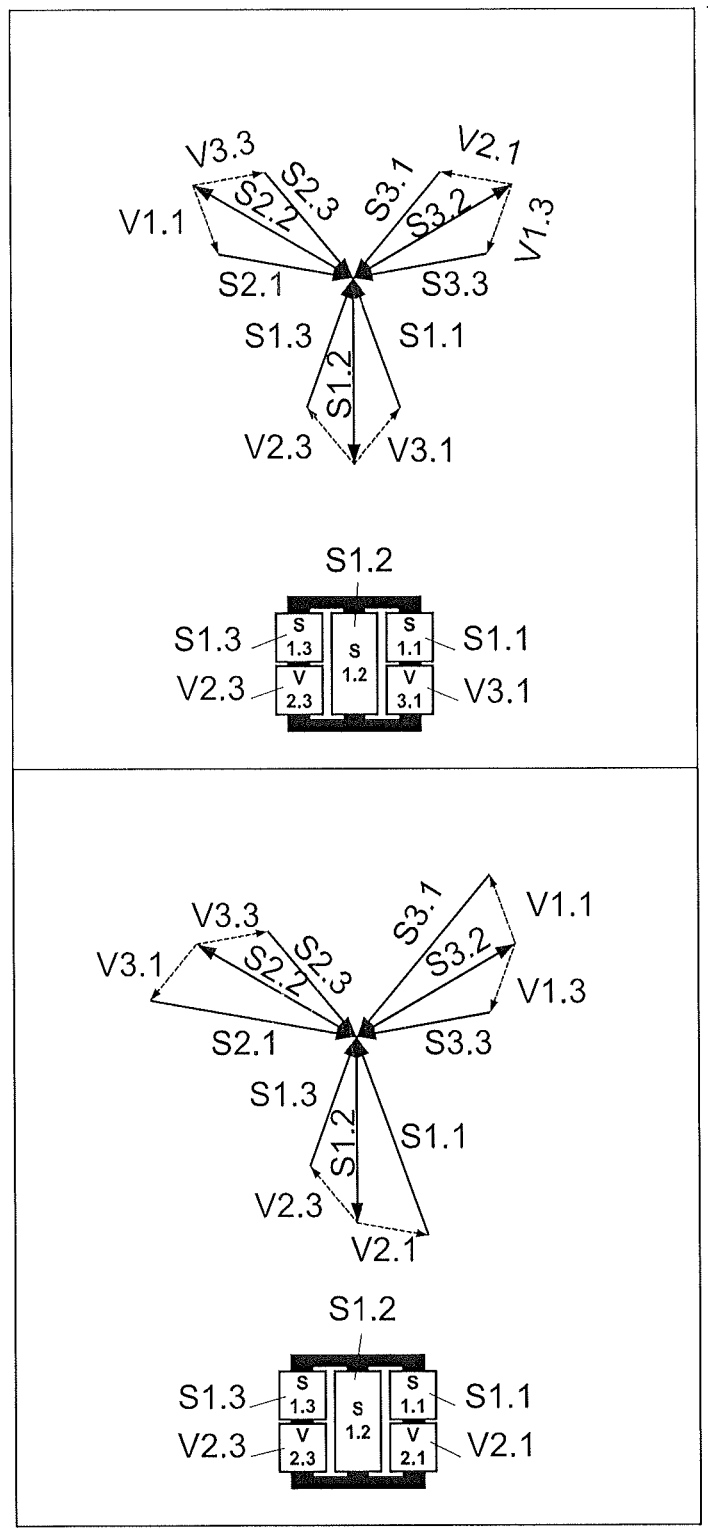
Fig.11B3

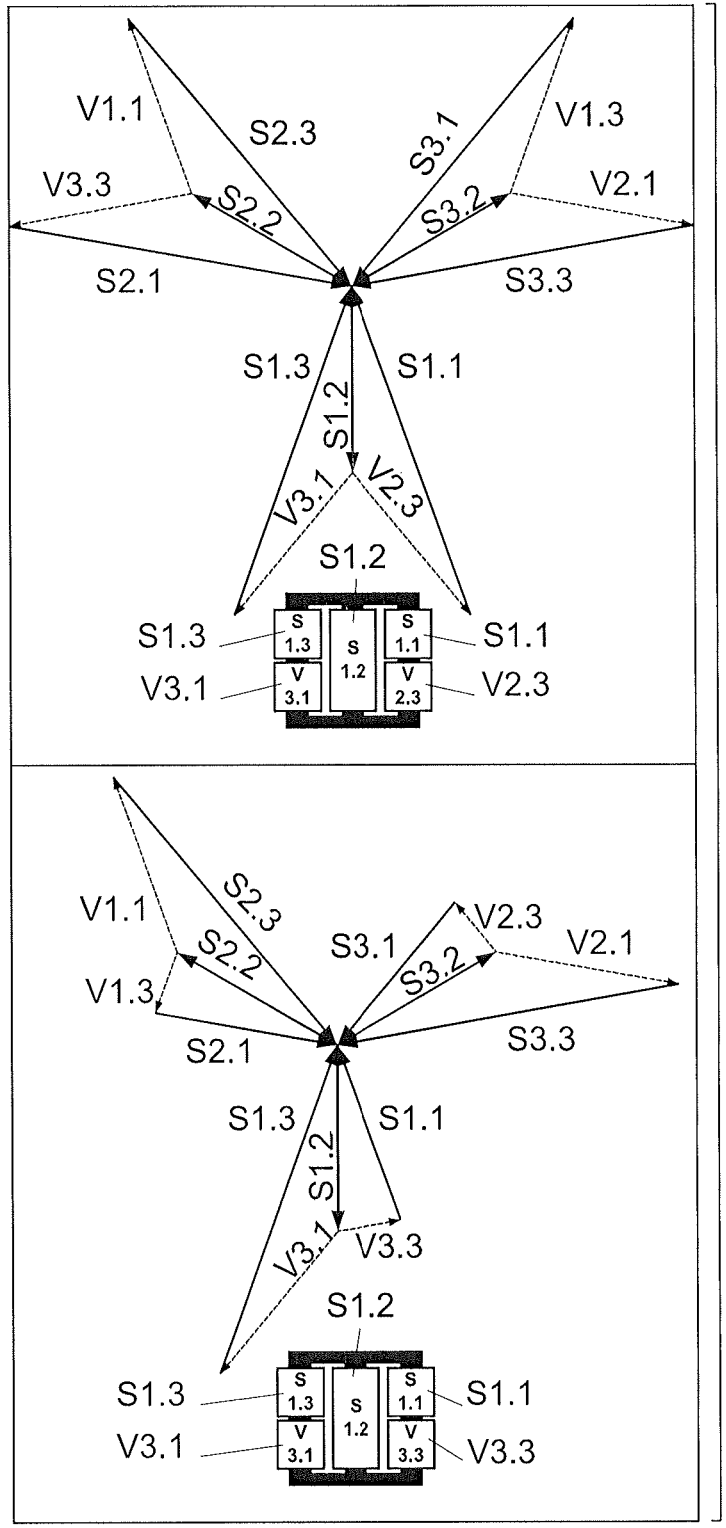
Fig.11B4

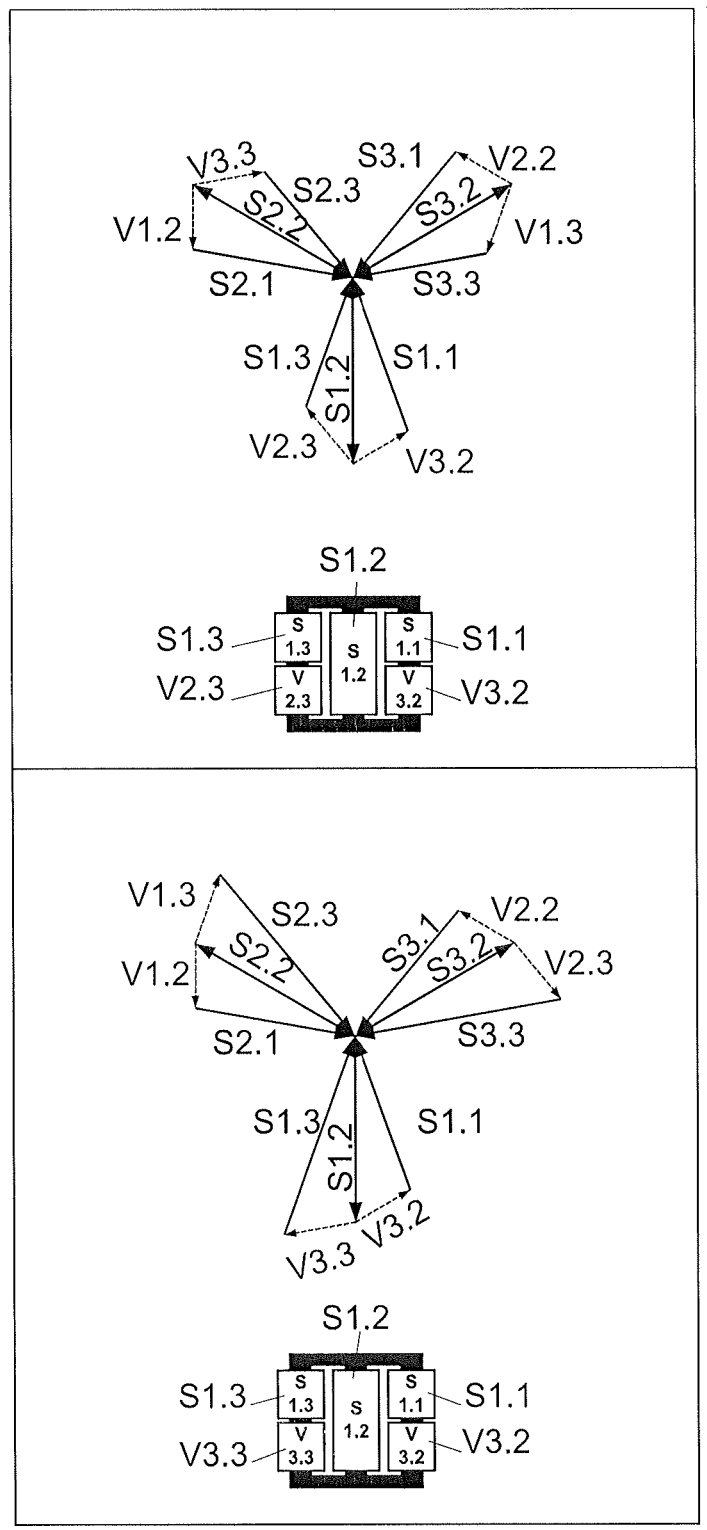
Fig.12B1

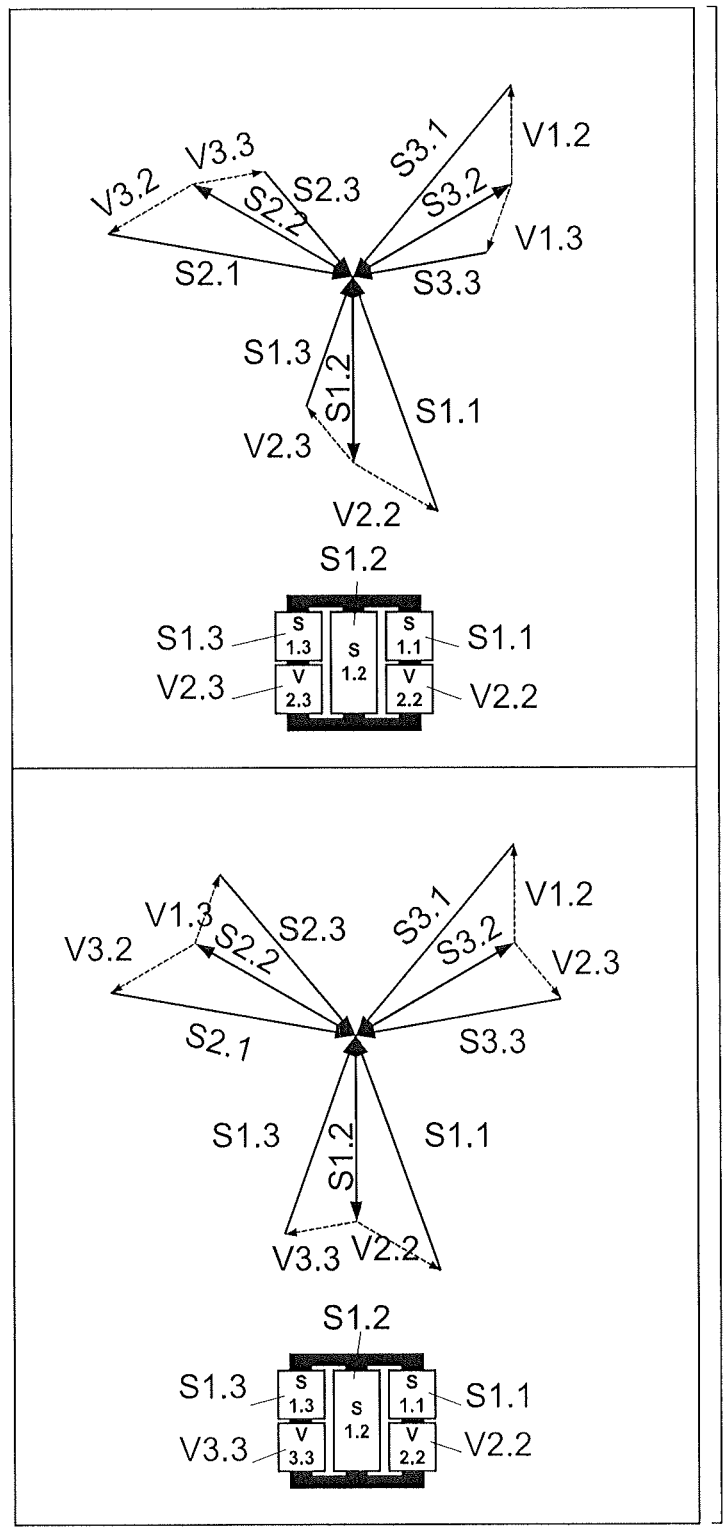
Fig.12B2

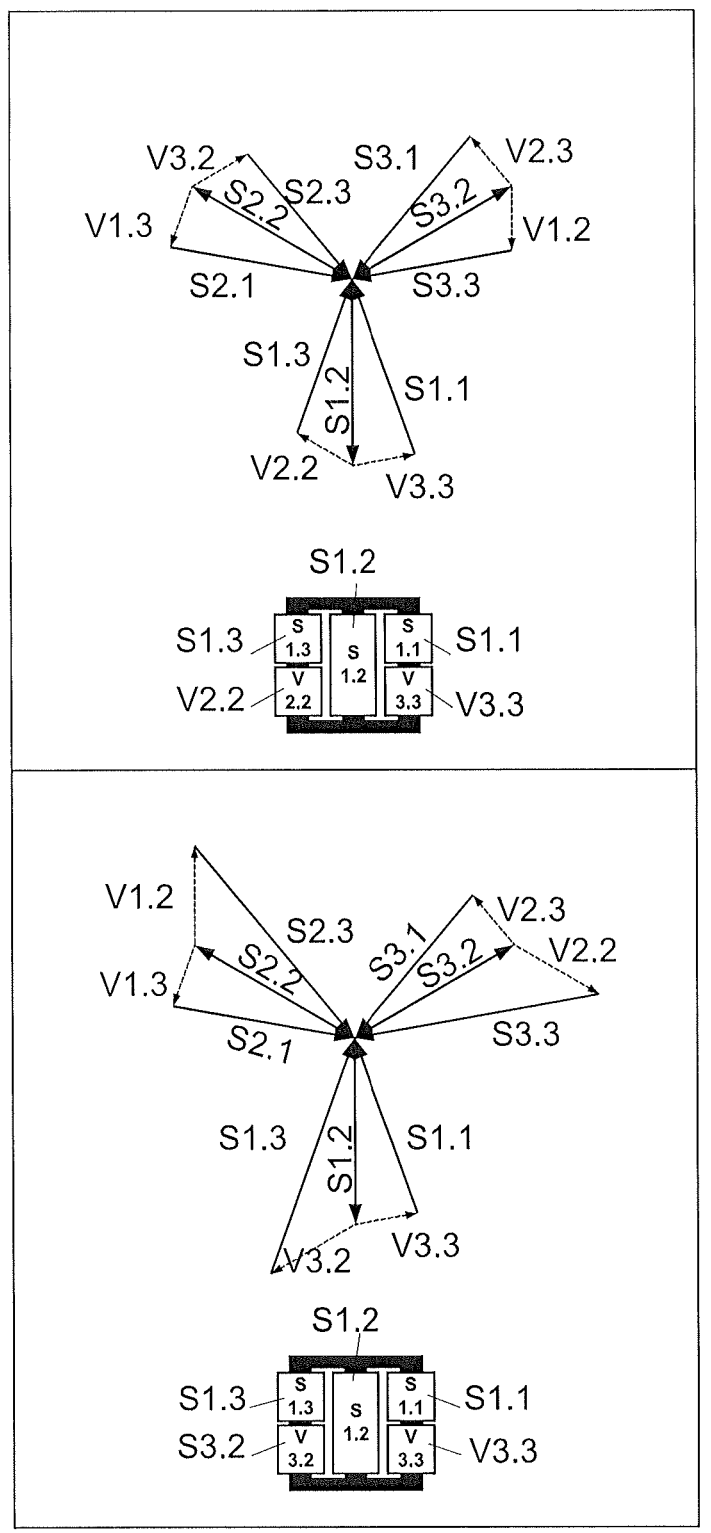
Fig.12B3

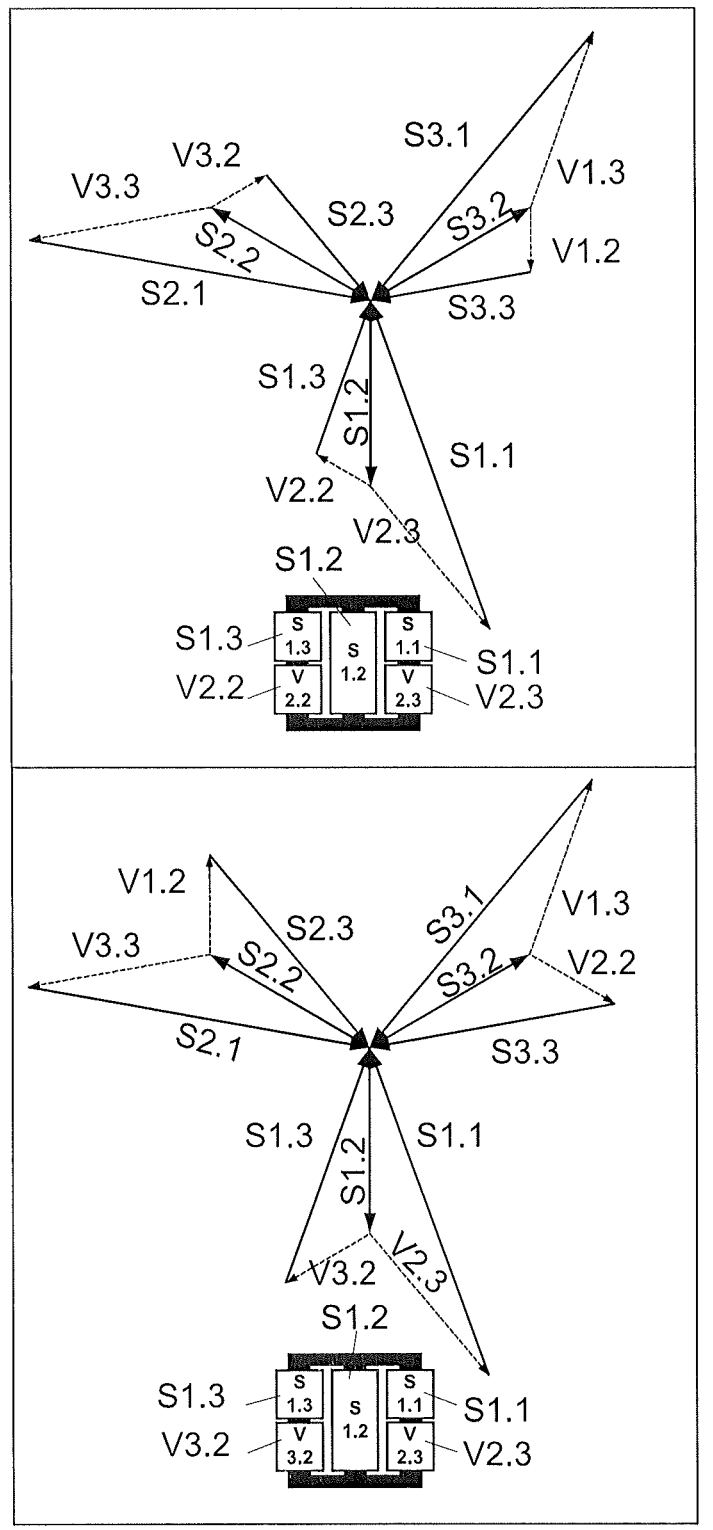
Fig.12B4

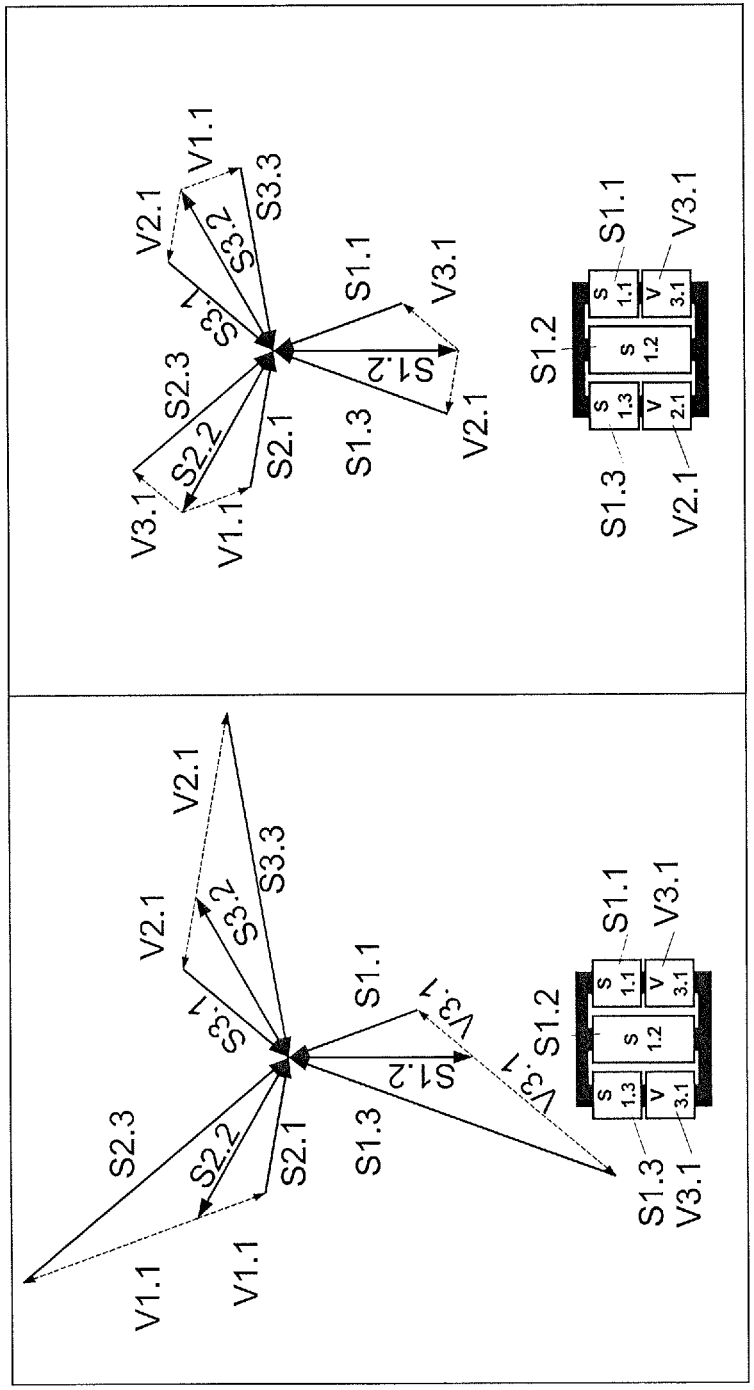
Fig.13B1  Fig.13B2

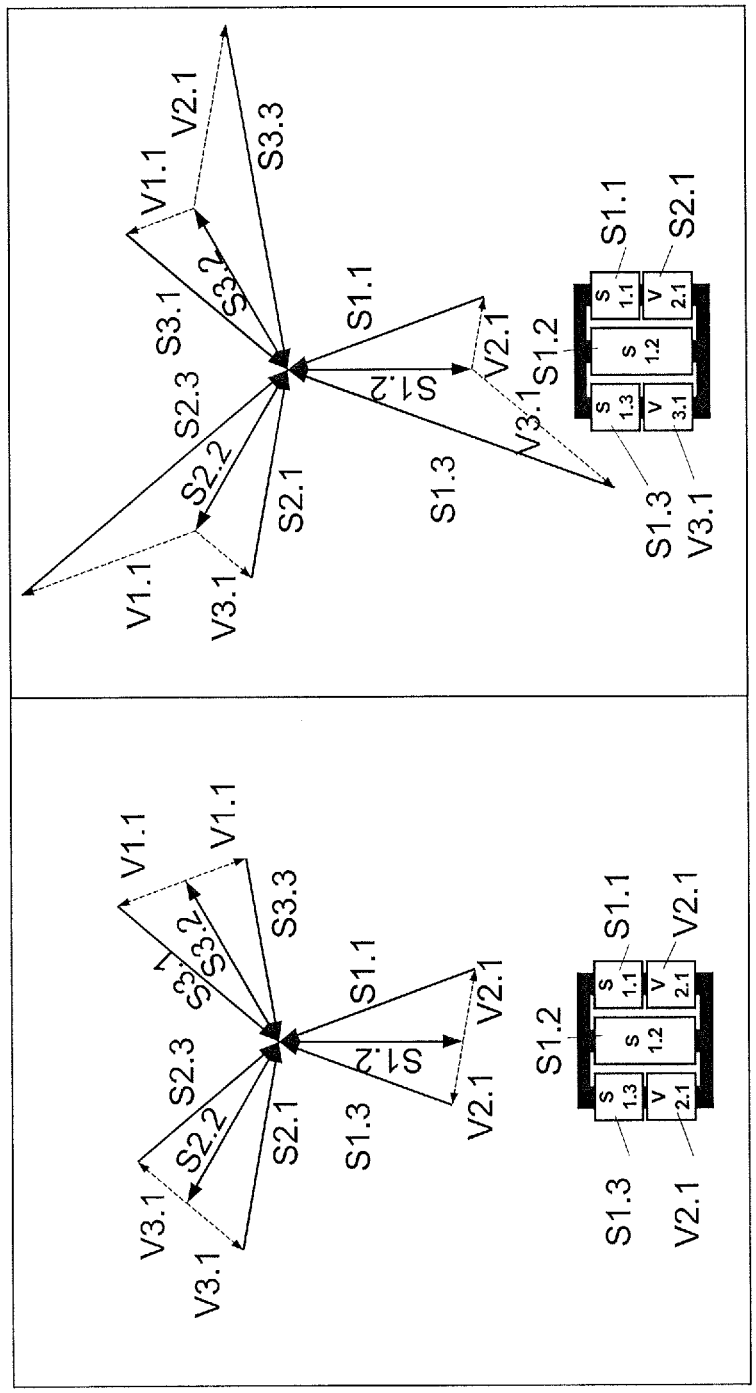
Fig.13B4
Fig.13B3

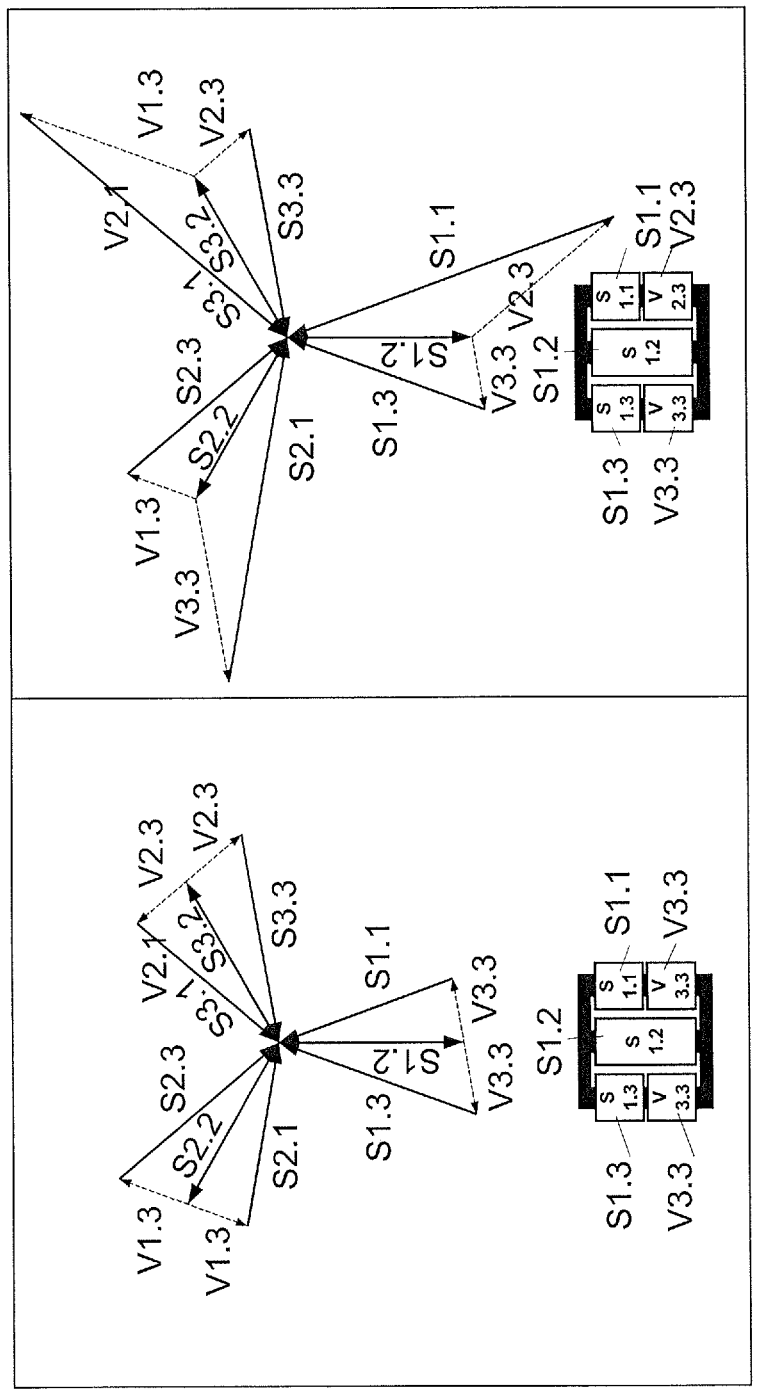

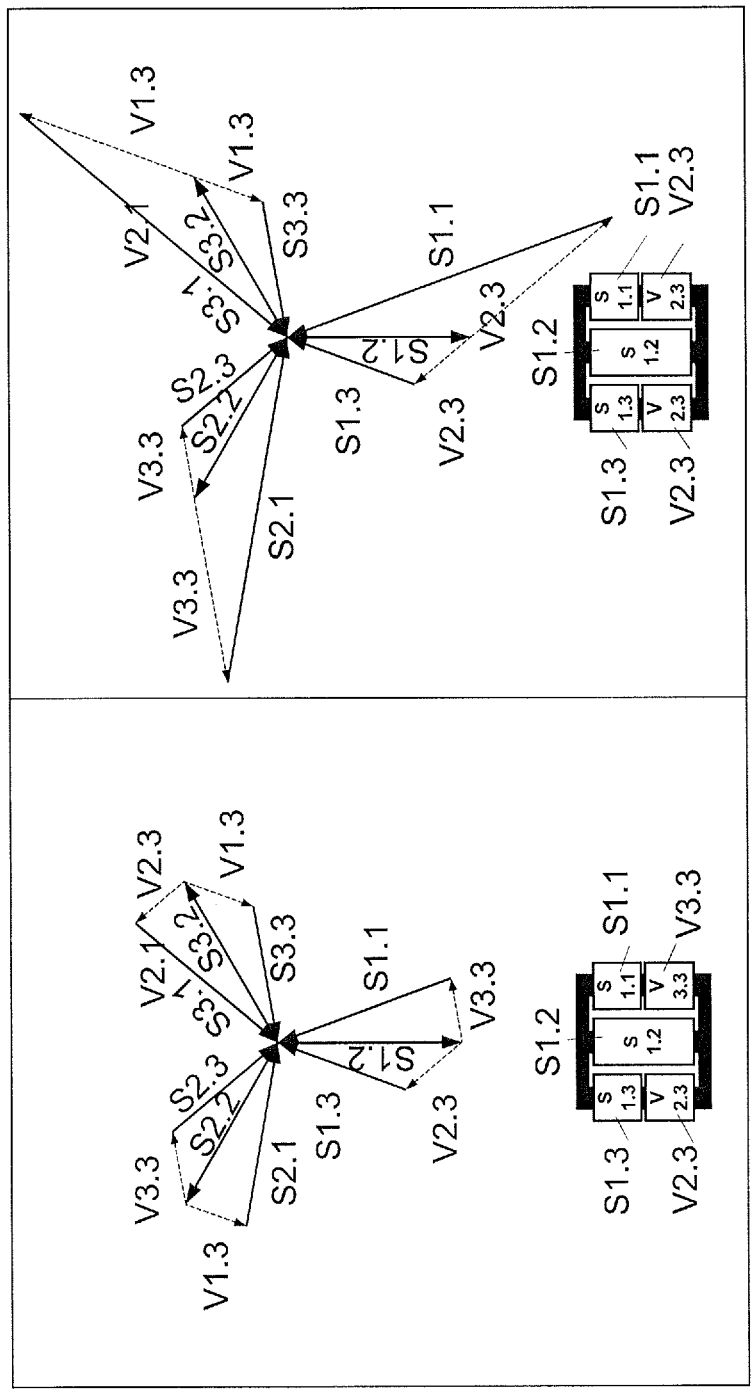

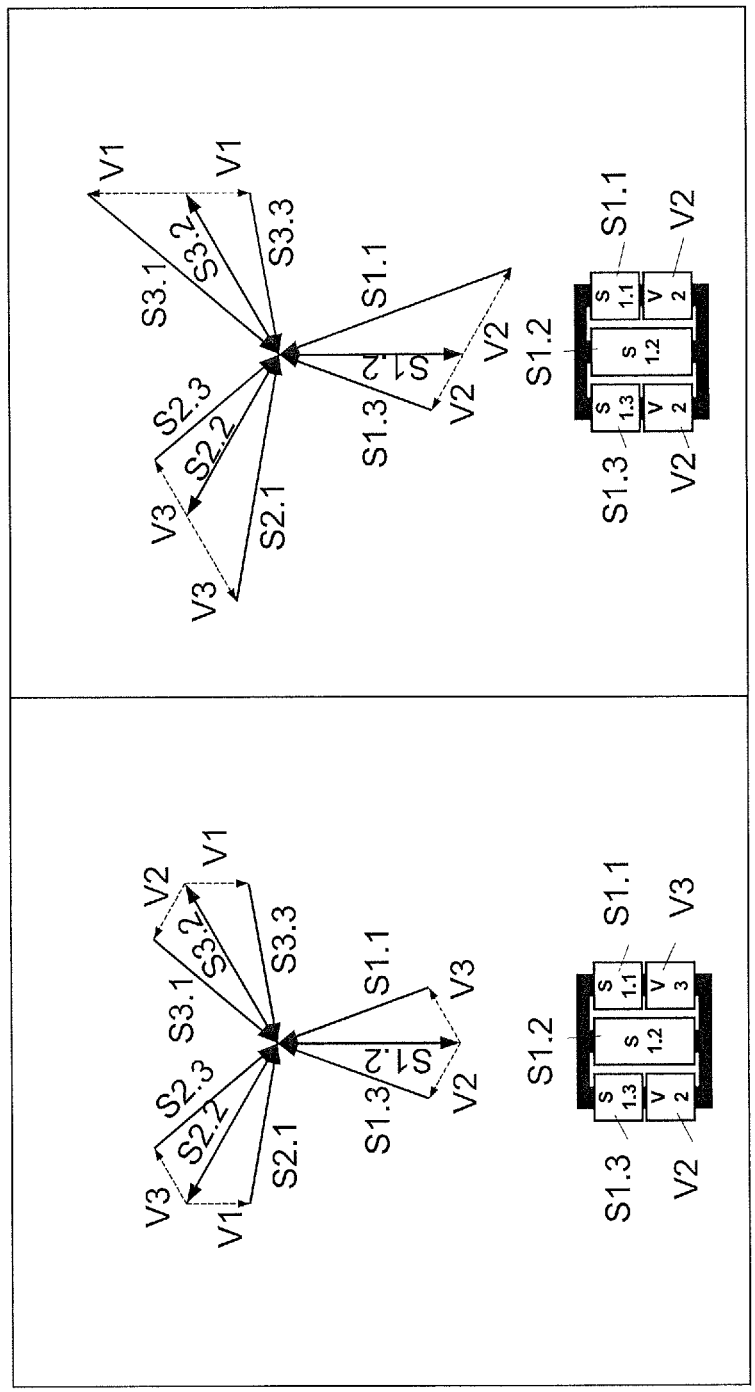

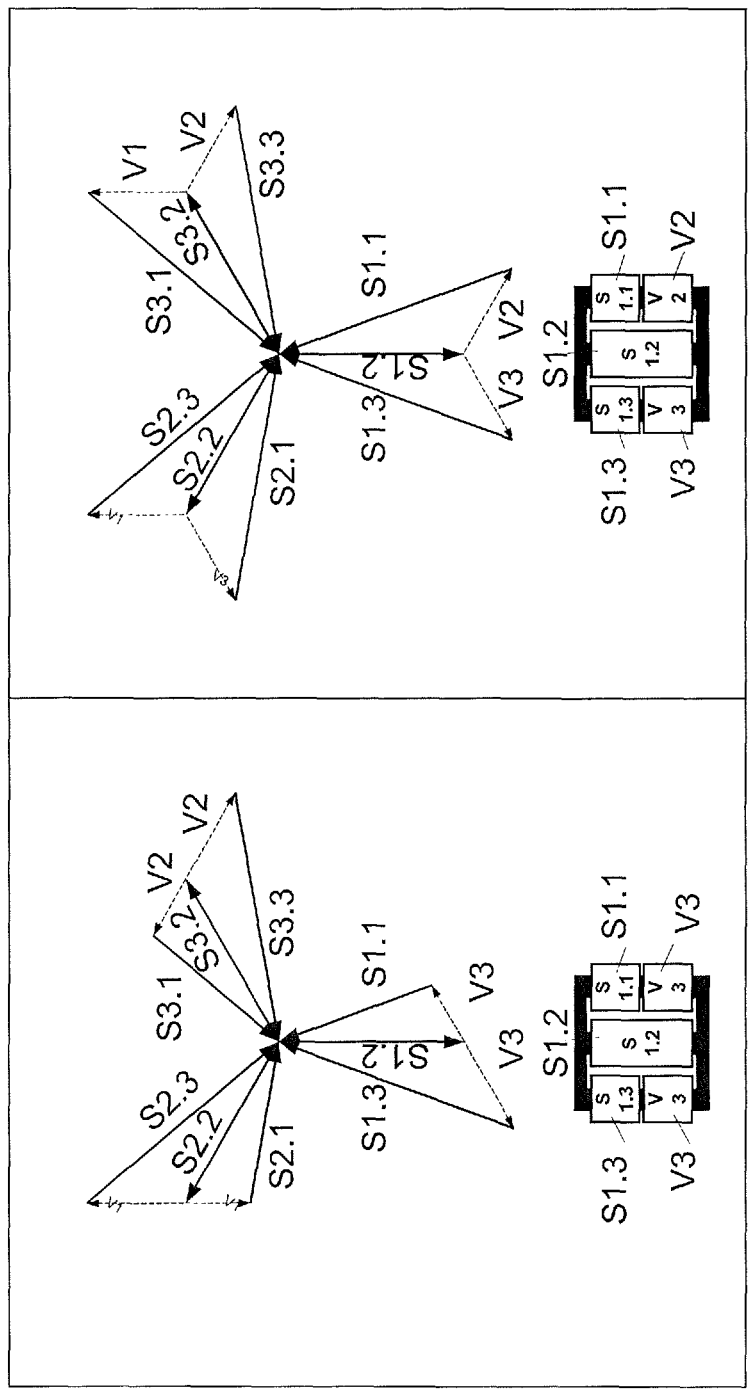
Fig.15B4
Fig.15B3

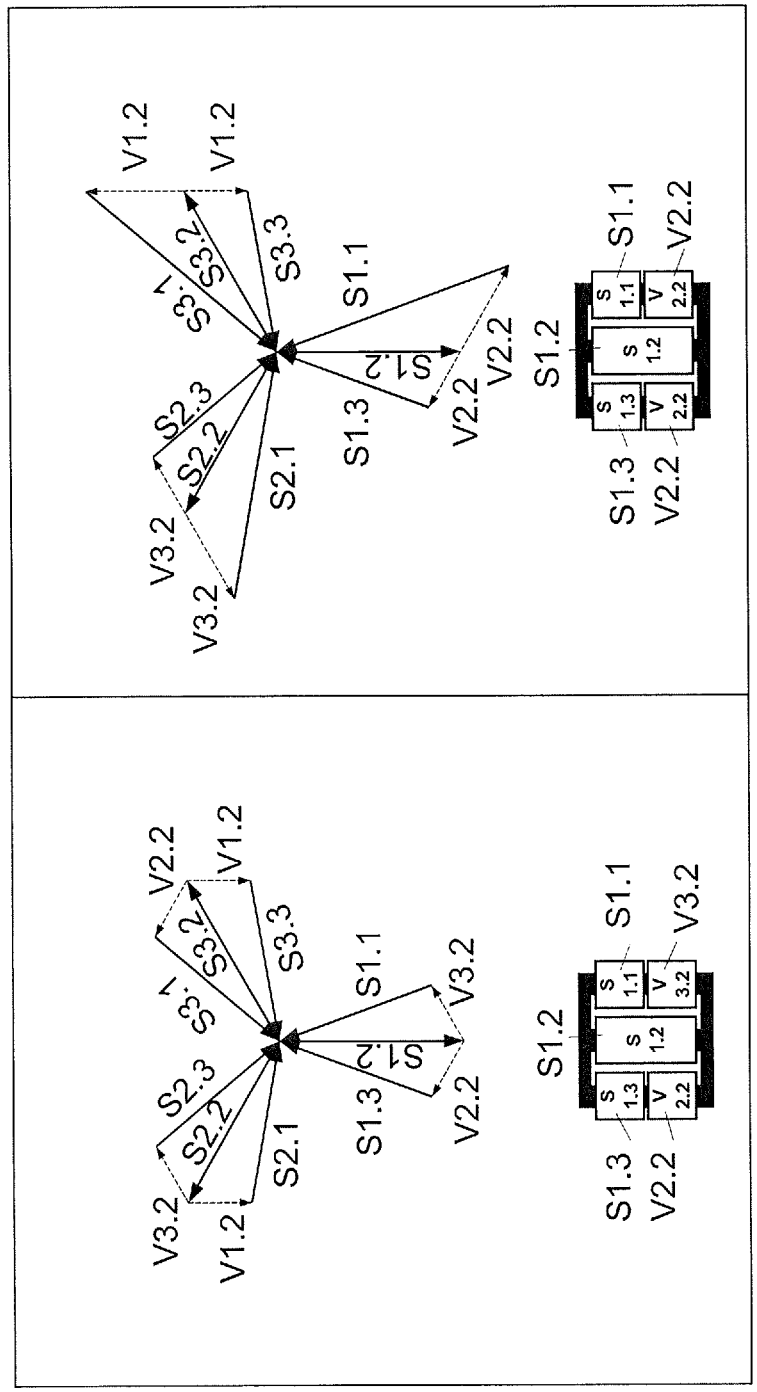

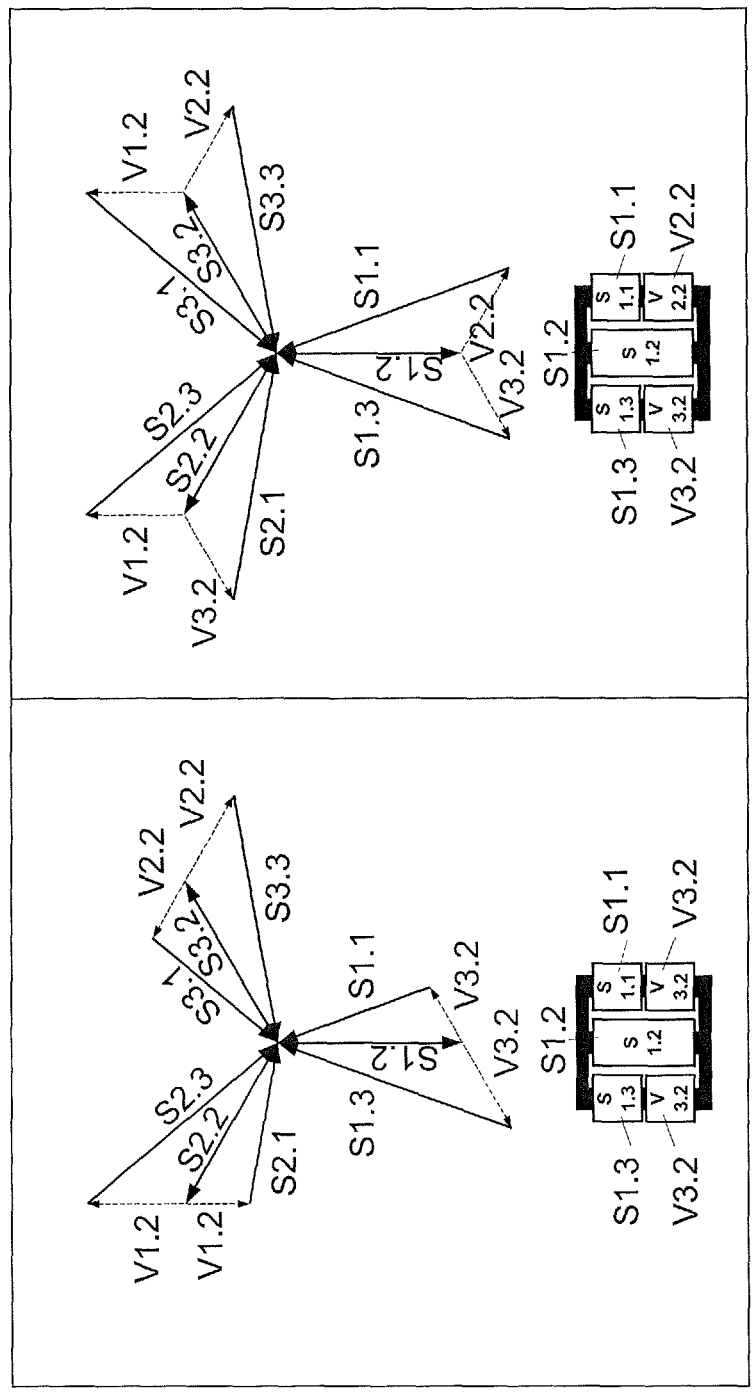

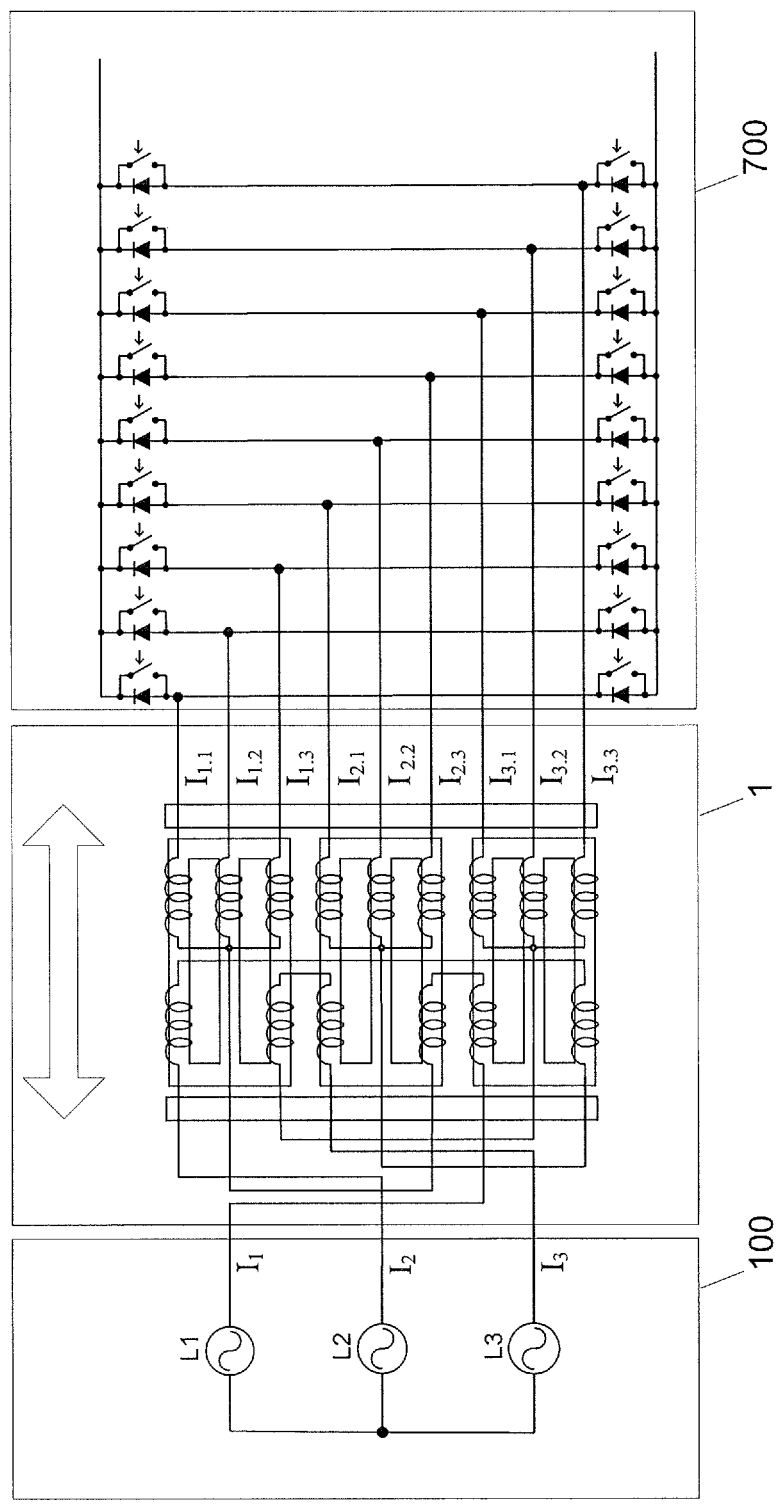

INTEGRATED MAGNETIC DEVICE FOR LOW HARMONICS THREE-PHASE FRONT-END

REFERENCE DATA

This application is a continuation of International Patent Application PCT/EP2011/059414 (WO2011154416) filed on Jun. 7, 2011, claiming convention priority of international patent applications PCT/EP2010/058157 of Jun. 10, 2010, and PCT/EP2010/058669 of Jun. 18, 2010 the contents whereof are hereby incorporated by reference.

FIELD OF THE INVENTION

Embodiments of the present invention concern an integrated magnetic device for low harmonics three-phase front-end, which can be unidirectional or bidirectional, and a bidirectional low harmonics three-phase front-end power converter including such device.

DESCRIPTION OF RELATED ART

The widespread use of power electronic equipment has increased the need of minimization of power lines harmonic pollution. Main source of current harmonics are non-linear power loads. An important non-linear power load is the six-pulse rectifier, which is widely used as a front-end solution for the majority of the three-phase equipments.

If there is not an efficient minimization of the current harmonics, some problems can occur. First, harmonics can destroy the quality of public power supply voltage and a low quality of the supply voltage causes malfunction and/or failure of many different kinds of electrical equipment supplied by the public power grid. Moreover harmonics can cause excessive losses in the components of the power grid such as transformers, power lines, etc. Further, harmonics have audible frequencies: if the power line polluted by harmonics is in the vicinity of an audible equipment installation, an audible distortion can be induced.

Different solutions have been used in the prior art to cope with the harmonics' problem. Multi-pulse rectifiers, i.e. a 12-pulse, are widely used as a simple interface with improved current waveforms. They reduce the harmonic currents and are very reliable but have some disadvantages: first they require a bulky and expensive line-frequency input power transformer to create galvanic isolation; moreover they are sensitive to voltage unbalance.

The use of a 6-pulse rectifier with a harmonic filter suppressing harmonics is also known. The harmonic filter can be passive or active. Passive filters have low power losses but are costly and have a big size and a big weight. Active filters are regarded as less reliable, have higher power losses and switching distortions and are quite expensive.

Another known solution is the active front-end, comprising controlled active switches, diodes and high frequency line reactors. Even if its size and weight can be attractive and its cost can be lower than other solutions, it presents some disadvantages, in particular it is perceived as less reliable, and it introduces unwanted switching distortion.

In general adding more pulses in the rectifier allows to suppress higher order harmonics. 12-pulses rectifiers allow the suppression of the $5^{th}$ and $7^{th}$ harmonics, which simple 6-pulses bridges cannot eliminate, but are ineffective against $11^{th}$ and $13^{th}$ harmonics, which can be suppressed with 18-pulses rectifiers. Increasing the number of pulses however adds to the complexity and cost of the device.

The known circuit represented schematically in FIG. 1A comprises an inductor 400 followed by a first splitter, or pre-splitter, 310 cascaded with a second-splitter, or post-splitter, 320, composed by three devices. The inductor 400 is preceded by a three-phase power line or grid 100 and the devices 310, 320 are connected to a 18-pulses rectifier supplying a generic DC load, which can be a motor drive, for example a converter DC/AC or DC/DC, or a generic resistor will be named in the following as the DC load. The load 200 of FIG. 1A, comprising the 18-pulses rectifier and a non illustrated DC load, is non linear and then harmonics are present in the power line. To cope with the harmonics' problem, the inductor 400, visible on FIG. 1B, and the four magnetic devices 310, 320 are used: the main function of the inductor 400 is the suppression of higher harmonics (e.g. $17^{th}$ and upwards); the main function of four magnetic devices 310, 320A-C (visible in FIGS. 1C and 1D) is splitting currents.

In FIG. 1A the devices 320 comprise three splitters with three windings each that are electrically connected each other. A different number and combination of windings are possible.

The three-phase inductor 400 and pre-splitter 310 are illustrated in side view in FIGS. 1B and 1C: inductor 400 comprises two yokes 405, three wound limbs 403 and air-gaps 402, 404 it can therefore store energy; pre-splitter 310 comprises a magnetic core without air-gaps and three wound limbs.

Side view of the three magnetic devices 320 of the state of the art are illustrated in FIG. 1D. Each device 320A, 320B and 320C does not contain air-gaps and comprises three vertical limbs: the central limb is a wound limb containing windings 302.

JP2000358372A and JP2007028846A describe a system allowing the elimination of the transformer and a method for reducing size and weight by using four magnetic devices dealing mainly with 12-pulses rectifiers.

U.S. Pat. Nos. 6,335,872, 6,249,443, 6,198,647, 4,876,634, 5,619,407, 5,124,904 and 4,779,181 describes examples of known multi-phase low harmonic systems.

The total number of magnetic devices used in a converter of the state of the art as illustrated in FIG. 1A is then at least five, i.e. the three-phase inductor 400 plus the four magnetic devices 310, 320.

As shown in FIG. 2, the inductor 400 comprises three current inputs, connectable to a three phase power grid or power line 100, and the device 310, following the inductor 400, comprise six current outputs, i.e. two current outputs for each current input. The current outputs are galvanically connected to the three current inputs and connectable to a load 200. If load 200 is resistive, then the circuit can be analysed exactly in terms of fundamental frequency phasors.

The three-phase electric power grid 100 supplies three approximately sinusoidal voltages with 120° phase shift. The phase shift between the three input currents $I_1$, $I_2$, $I_3$ flowing in the three current inputs is then equal to 120° as illustrated in FIG. 3A. The amplitude and the frequency of the line voltages will vary according among others to local regulations, but the frequency will be equal, in most applications, to 50 Hz or 60 Hz, and the voltage is usually comprised between 100 V and 1 kV, for example 400 V rms between phases. The frequency of 50 Hz or 60 Hz or the frequency of the power grid 100 will be referred to in the following as the fundamental frequency of the system.

Each of the currents flowing in the three current inputs and having the reference $I_1$ or $I_2$ or $I_3$ will be named in the following as the common current. If the inductor 400 is not present in the converter of FIG. 2, the three common currents $I_1, I_2, I_3$ are in phase with the voltage phasors of the power grid 100, otherwise a lagging angle δ is present.

Referring now to FIG. 3B, when the devices 310, 320 are connected between the three phase power grid 100 and the resistive load 200, they split each of the common currents $I_1$, $I_2$, $I_3$ into three currents flowing in each current outputs. In the case shown in FIG. 2, they split each of the current $I_1, I_2, I_3$ into three currents: the common current $I_1$ is split into the three split currents $I_{1.1}, I_{1.2}, I_{1.3}$ the common current $I_2$ is split into the three split currents $I_{2.1}, I_{2.2}, I_{2.3}$ and the common current $I_3$ is split into the three split currents $I_{3.1}, I_{3.2}, I_{3.3}$. The currents $I_{1.1}, \ldots I_{3.3}$ flowing in the current outputs have all the same amplitude and are phase shifted of a predetermined angle respect to the corresponding fundamental components flowing in the current input. Current $I_{1.2}$ is in phase with $I_1$, current $I_{2.2}$ is in phase with $I_2$, and current $I_{3.2}$ is in phase with $I_3$.

The value of the angle depends from the desired number of rectification pulses. It is, in the case of a 18-pulses system as presented in FIG. 2 of 0° and ±20°.

As discussed, a common current, for example $I_1$, is split into three split currents: a first split current $I_{1.1}$, which will be called in the following leading split current, a second split current $I_{1.2}$, which will be called in-phase split current and a third one $I_{1.3}$ which will be called in the following lagging split current. The other phases are similarly arranged.

If the value of the angle φ is 20° as mentioned, the ideal length of the phasors of the FIG. 3B, which is the same for all represented phasors, is 33.67% of the length of each phasor of FIG. 3A.

The presence of the three-phase inductor 400 before the devices 310, 320 causes a lagging angle or phase shift angle δ shown in FIG. 3A between each of the voltage phasors of the power grid 100, represented by dashed lines, and the corresponding input currents $I_1$ or $I_2$ or $I_3$. As shown in FIG. 3B, the lagging angle or phase shift angle δ is still present in the phasor diagram of the output currents.

As mentioned, in practical realizations the load 200 to which devices 310, 320 are connected is composed by a rectifier followed by a DC load.

The solutions described in the related art are not optimised for reducing the cost and the size of a low harmonics three-phase front-end.

Moreover the functions of delaying and splitting currents are performed by five separated devices, respectively the inductor 400 and four magnetic devices 310, 320A-C. Splitter 310 is not introducing any phase shift, and devices 320A-C introduce a phase shift of ±20°.

A solution allowing a low harmonic power converter having lower cost and lower size than the prior art is needed.

A magnetic device for 18-pulse front-end allowing high efficiency and reliability is needed.

A solution allowing a low harmonics three-phase front-end less sensitive to the imbalance of the power grid is needed.

A low harmonics three-phase front-end having low failure rate, low power losses and low switching distortion is also needed.

BRIEF SUMMARY OF THE INVENTION

The aim of the present invention is to provide an integrated magnetic device performing the functions of the inductor 400 and of the pre-splitter and post-splitter magnetic devices 310, 320. The adjective integrated means in fact that the magnetic device of the invention performs more than one function. In particular the functions of delaying and splitting currents are both performed by the same magnetic device, allowing a lower size, weight, cost and better symmetry of the device than the prior art.

Another object of the present invention is to provide a low harmonics three-phase bidirectional front-end power converter comprising a simple semiconductor circuitry.

Another object of the present invention is to provide a magnetic device reliable and efficient.

According to the invention, these aims are achieved by means of a integrated magnetic device for low harmonics three-phase front-end, by means of a use of this integrated magnetic device in a AC/DC rectifier and in a DC/AC inverter and by means of a low harmonics bidirectional three-phase front-end power converter.

The device according to the invention comprises three magnetic sub-assemblies, wherein each magnetic sub-assembly comprises a magnetic core without air gaps, three wound limbs and at least five windings. In other words the device according to the invention comprises three sub-assemblies which are magnetically coupled. In one embodiment the device comprises at least one first common yoke and at least one second common yoke for magnetically coupling the three magnetic sub-assemblies. In another preferred embodiment the two common yokes are identical and juxtaposed on the top respectively on the bottom of the three magnetic sub-assemblies. In another embodiment the three sub-assemblies are placed sufficiently close to each other so that they are magnetically coupled without common yokes.

Advantageously the device comprises at least one air-gap between the three magnetic sub-assemblies and one of the two common yokes. In a preferred embodiment it comprises two air-gaps, i.e. a first and a second air-gaps respectively between the top and the bottom of the three magnetic sub-assemblies and the first respectively second common yokes.

The device has three current inputs connectable to a three phase power line or grid and at least three current outputs for each current input. In a preferred embodiment the device has nine current outputs, i.e. three current outputs for each current input. The current outputs are galvanically connected to the three current inputs and can be connected to a load.

Each of the three magnetic sub-assemblies comprises a first yoke and a second yoke which constitute together with the three wound limbs a magnetic core without air-gaps. Each of the three magnetic sub-assemblies can comprise moreover three bobbins assembled on this magnetic core, in particular placed on three limbs.

Advantageously the net sum of the magnetic fluxes at the fundamental frequency entering into the first or second common yokes is zero.

When said device is connected between the three phase power grid and the load, the fundamental components of the currents flowing in each of the current outputs are phase shifted of a predetermined angle respect to the corresponding fundamental component of the current flowing in the current input. The angle's value depends on windings' turn ratios as it will be clear in the following.

In a first embodiment the device comprises one first common yoke and one second common yoke having a rectangular shape. In this case the three magnetic sub-assemblies are aligned.

In another embodiment the device comprises two first common yokes and two second common yokes having a rectangular shape. In this embodiment the magnetic device comprises four ventilation channels which can be used for cooling it by air flowing.

In another embodiment the device comprises one first and one second common yokes having a triangular or circular or polygonal shape. In these cases the three magnetic sub-assemblies are disposed respectively in a triangular or circular or polygonal manner and the device comprises a central hole. An air flow can advantageously pass through this hole and efficiently cools the device. This embodiment is easy to produce and has a better symmetry than the previous embodiments, i.e. it is characterised by identical parameters for all the three phases.

Some energy is stored in a magnetic field inside the air-gaps. In such a case a lagging angle or phase shift angle δ between each of the voltage phasors of the power grid 100 and the corresponding input currents $I_{L1}$ or $I_{L2}$ or $I_{L3}$ of the magnetic device can be observed as shown in FIG. 3A. In this case the inductor function is integrated in the device according to the invention. Moreover it is easy to control the value of the inductance of this device by changing the thickness of the air-gap, which is in the order of magnitude of a few mm.

As mentioned, in a variant of the invention the device according to the invention could comprise three sub-assemblies magnetically coupled without common yokes. In this case, energy is stored in the magnetic field occupying the space surrounding the sub-assemblies.

Advantageously the magnetic device of the invention can be used both in AC/DC or in DC/AC converters. If it is used in an AC/DC converter, for example in combination with a 18-pulse rectifier, the current flow goes from the current inputs or common paths of the device to its current outputs or split paths. In this case the device works as a current splitter: the common current in the common path is forced to split into three identical but phase shifted split currents in the split paths. In one embodiment the common current is forced to split into more than three identical but phase shifted split currents.

If the device is used in a DC/AC converter, the current flow goes from the three split paths to the common path. In this case the device works as a current merger. In both cases the action of the device reduces the harmonic currents. In an AC/DC or in a DC/AC converter comprising this magnetic device a galvanic isolation is not possible.

Advantages of the solution as compared with the prior art include in particular the possibility to use a single device performing the function of an inductor plus those of a splitter including several separate magnetic devices of the state of the art. The device comprises one magnetic device, instead of the several magnetic devices of the state of the art solution (one pre-splitter, three post-splitters 320A-C and one device for the inductor 400). This magnetic device is constituted by the three magnetic sub-assemblies and in a preferred embodiment also by the two common yokes.

The solution further reduces the size, the weight and the cost of a low harmonic power converter and allows high reliability and efficiency and low EMI (electro-magnetic interference). Moreover it can be realized using a lot of arrangements for the windings of the magnetic sub-assemblies' wound limbs.

The solution eliminates some important harmonics like known multi-phase rectifiers and it is less sensitive to the voltage unbalance of the power grid.

BRIEF DESCRIPTION OF THE DRAWINGS

The invention will be better understood with the aid of the description of an embodiment given by way of example and illustrated by the figures, in which:

FIG. 1A shows a know inductive current splitter with a three-phase inductor, a first pre-splitter magnetic device and three post-splitter devices connected between a three-phase power line and a load comprising a 18-pulse rectifier.

FIG. 1B shows a side view of a three-phase inductor being part of the device of FIG. 1A.

FIG. 1C illustrates the pre-splitter magnetic device of FIG. 1A.

FIG. 1D shows a side view of the three post-splitters illustrated in FIG. 1A.

FIG. 2 shows a general block diagram of a three-phase inductor and a splitter device with a pre-splitter and three splitter devices of the state of the art, connected between a three-phase power line and a load comprising a 18-pulse rectifier, represented as a resistive load.

FIGS. 7B1-7B4, 8B1-8B4, 9B1-9B4, 10B1-10B4, 11B1-11B4, 12B1-12B4, 13B1-13B4, 14B1-14B4, 15B1-15B4, and 16B1-16B4 show, for the winding arrangements illustrated in the corresponding FIGS. 7A, 8A, 9A, 10A, 11A, 12A, 13A, 14A, 15A, and 16A, possible placements of the windings on the limbs of one of the three magnetic sub-assemblies of the magnetic device according to the invention and the corresponding phasor diagram of MMF vectors of one of the three magnetic sub-assemblies.

FIG. 19 shows a harmonics cancelling 18-pulse front-end with a bidirectional power flow comprising an example of integrated magnetic device for low harmonics three-phase front-end according to one aspect of the invention.

DETAILED DESCRIPTION OF POSSIBLE EMBODIMENTS OF THE INVENTION

The integrated magnetic device of the invention is designed for a low harmonics three-phase front-end, unidirectional or bidirectional. Its use enables a reduction of the harmonics of the currents drawn from or injected to three phase power lines. It has a lower cost and size compared to the state of art solutions.

Figure 4A:
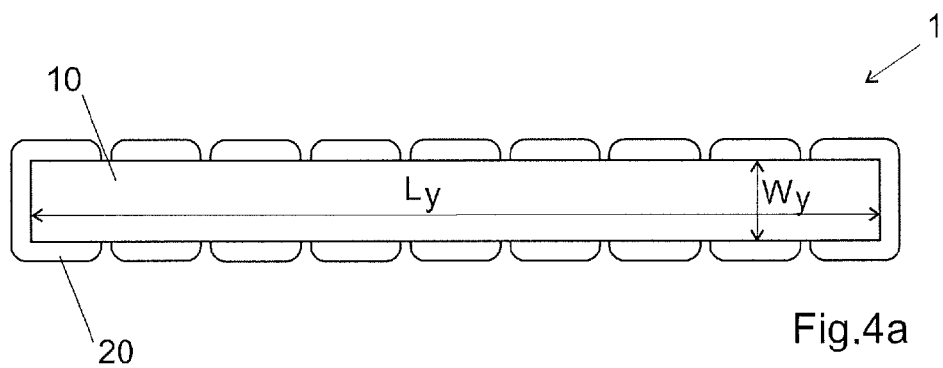
FIGS. 4A, 4B and 4C show respectively a top view, a side view and another top view with removed common yokes of one embodiment of the integrated magnetic device for low harmonics three-phase front-end according to the invention.
Figure 4B:
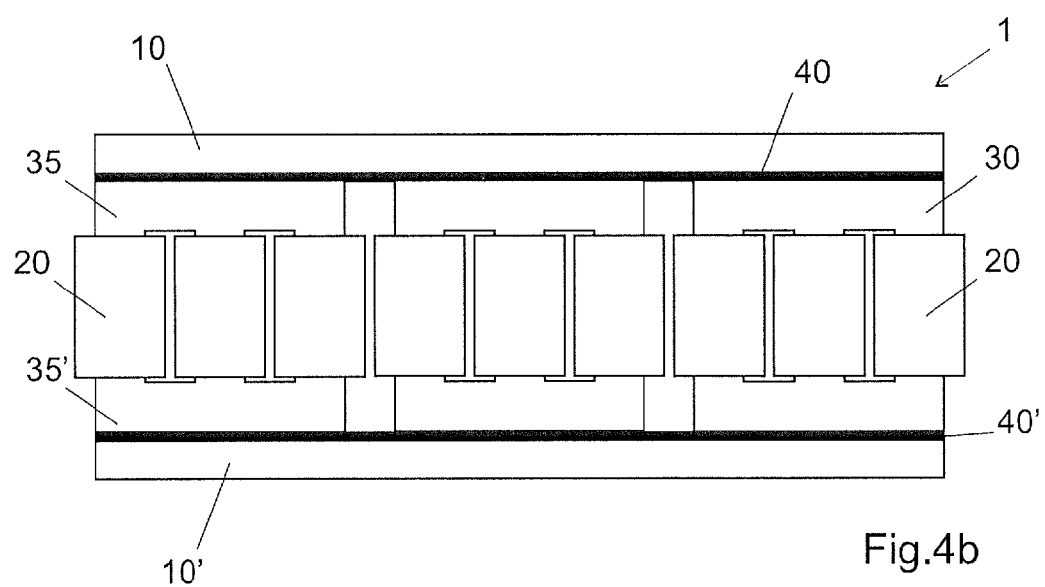
Figure 4C:
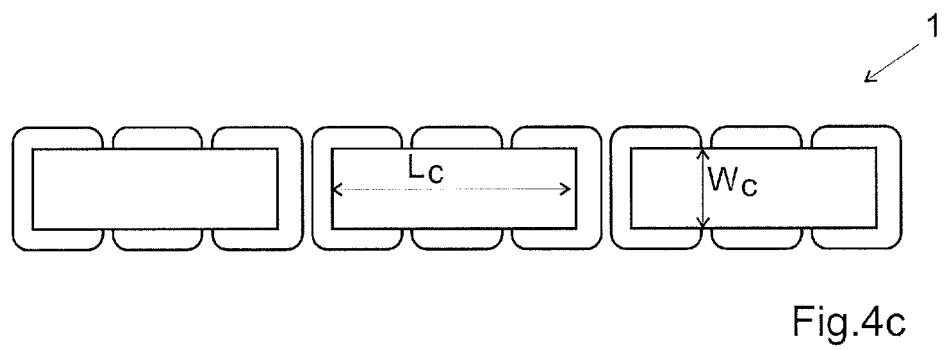

FIGS. 4A, 4B and 4C show respectively a top view, a side view and another top view with removed common yoke of one possible embodiment of the device 1 according to the invention. In this embodiment the device 1 comprises three magnetic sub-assemblies 30, wherein each magnetic sub-assembly 30 comprises three wound limbs and at least five windings. In low or medium power applications, i.e. applications with a power inferior to 50 kW, each wound limb can comprise a bobbin 20. For high power applications, the windings are wound on the magnetic sub-assemblies without bobbins, by using four or more space holders for distancing the windings from the core.

Each of the three magnetic sub-assemblies 30 comprises a first yoke 35 and a second yoke 35' which constitute together with the three limbs a close magnetic core without air-gaps.

Advantageously the net sum of the magnetic fluxes, both for fundamental frequency and harmonics, entering into the first respectively second common yokes is zero. In other words, no flux radiates outside the device.

In this embodiment the device comprises one first common yoke 10 and one second common yoke 10' which are identical. The three separated magnetic sub-assemblies 30 and the two common yokes 10 and 10' are juxtaposed on the top respectively on the bottom of the three separated magnetic sub-assemblies 30.

The device comprises two air-gaps 40 and 40', i.e. a first and a second air-gap respectively between the top and the bottom of the three magnetic sub-assemblies 30 and the first 10 respectively second 10' common yoke. The device of the invention can comprises only one air-gap between the three magnetic sub-assemblies 30 and one of the two common yokes 10 and 10'.

In this embodiment the first common yoke 10 and the second common yoke 10' have a rectangular shape. In this case the three magnetic sub-assemblies 30 are aligned, i.e. the rectangular hole between the two wound limbs of one magnetic sub-assembly 30 is aligned with the holes of the other two magnetic sub-assemblies 30. In the embodiment represented in FIGS. 4A to 4C, the width $W_Y$ of the cross-section of the common yokes 10, 10' is equal to the width $W_C$ of the cross-section of each magnetic sub-assembly 30. In a preferred embodiment each of the three magnetic sub-assemblies 30 has a rectangular section, with a length $L_C$ of the cross-section superior to its width $W_C$.

In a preferred embodiment the length $L_Y$ of the cross-section of the common yokes 10, 10' is superior to five times the length $L_C$ of the cross-section of the magnetic sub-assemblies 30, i.e. $L_Y > 5 * L_C$ as shown in FIGS. 4A to 4C.

Figure 5A:
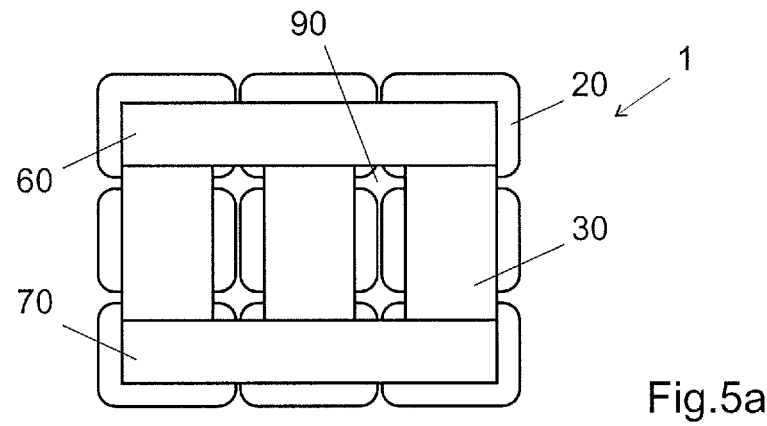
FIGS. 5A, 5B and 5C show respectively a top view, a side view and another top view with removed common yokes of another embodiment of the integrated magnetic device for low harmonics three-phase front-end according to the invention.
Figure 5B:
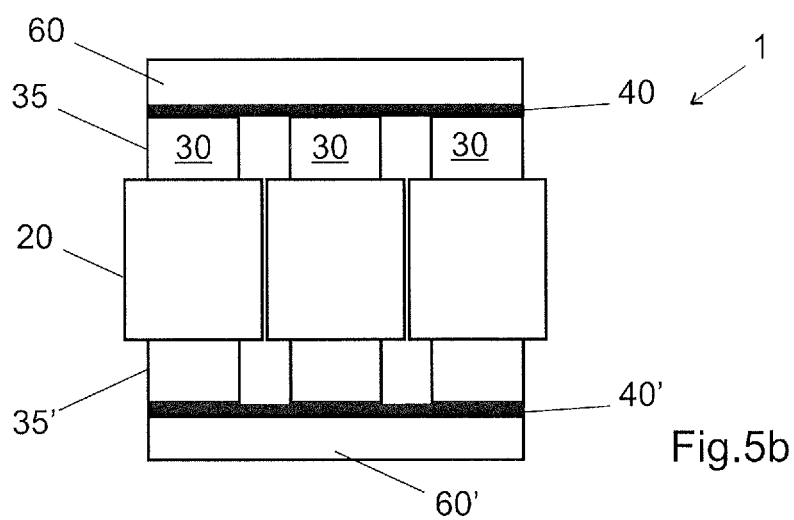
Figure 5C:
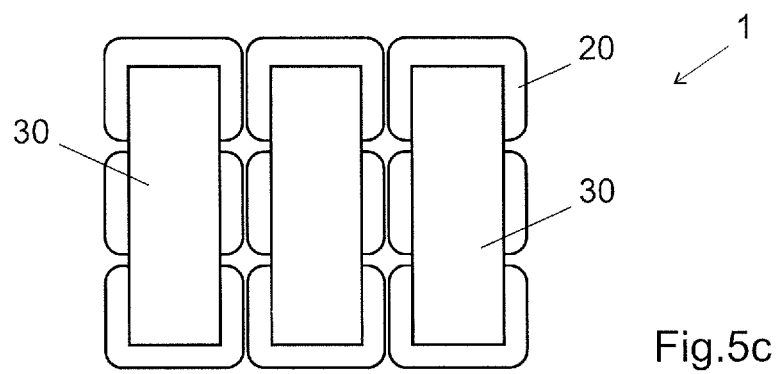

In the embodiment of FIGS. 5A to 5C the three magnetic sub-assemblies 30 are parallel, i.e. the rectangular hole between the two wound limbs of one magnetic sub-assembly 30 is in front of the rectangular hole between the two wound limbs of another magnetic sub-assembly 30.

In this embodiment the device 1 comprises two first common yokes 60, 70 and two second common yokes 60', 70' having a rectangular shape. In this manner the integrated magnetic device 1 of this embodiment advantageously comprises four vertical ventilation passages 90 which can be used for cooling it. The number of common yokes is not limited to two or four, but the invention includes variants with any number of common yokes. In fact, if the sub-assemblies are sufficiently close one to each other, the common yokes could in some case be suppressed entirely.

Again, the device 1 can comprise at least one air-gap between the three magnetic sub-assemblies 30 and the first common yokes 60, 70 and the second common yokes 60', 70'. In a preferred embodiment it comprises two air-gaps, a first air-gap 40 between the first yoke 35 of each magnetic sub-assembly 30 and the first common yokes 60, 70 and a second air-gap 40' between the second yoke 35' of each magnetic sub-assembly 30 and the second common yokes 60', 70'.

Figure 6A:
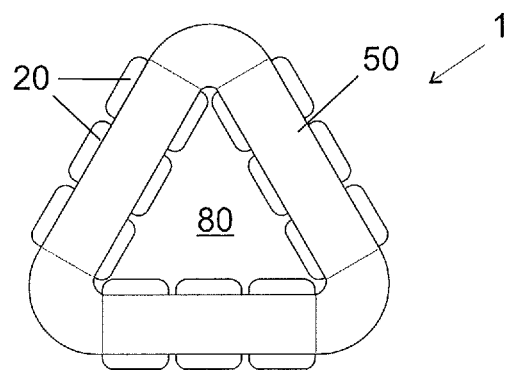
FIGS. 6A, 6B and 6C show respectively a top view, a side view and another top view with removed common yokes of another embodiment of the integrated magnetic device for low harmonics three-phase front-end according to the invention.
Figure 6B:
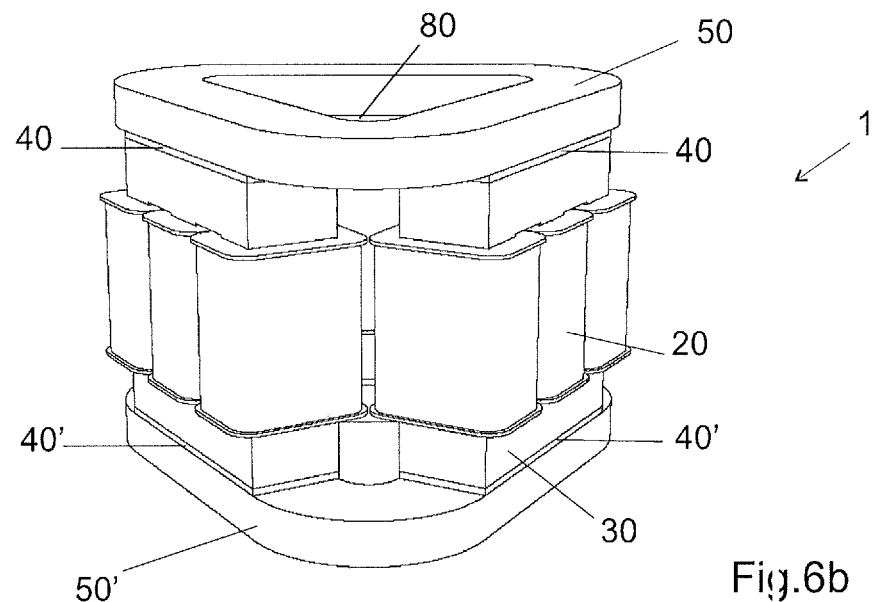
Figure 6C:
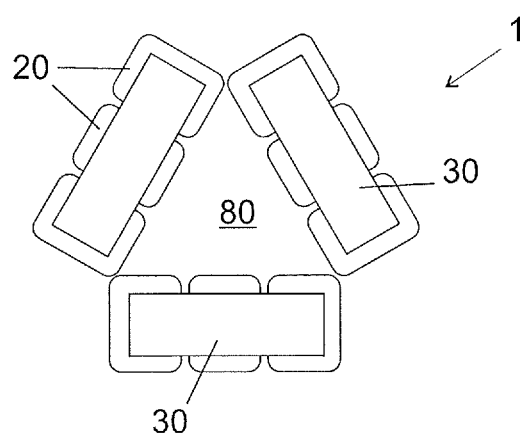

In the embodiment of FIGS. 6A to 6C, which show a top view, another top view with removed common yokes and a side view of the magnetic device 1, there are one first 50 and one second 50' common yokes having a triangular shape. In this case the three magnetic sub-assemblies 30 are disposed along the sides of a triangle. In another embodiment the first 50 and second 50' common yokes have a circular or polygonal shape and the three magnetic sub-assemblies 30 are disposed respectively in a circular or polygonal manner.

The device comprises a central hole or vertical passage 80. In the illustrated embodiment the hole 80 is triangular. An air flow can advantageously pass through this hole 80 and efficiently cools the device. Moreover this embodiment has a better symmetry than the previous embodiments, i.e. it is characterised by identical parameters for all the three phases. The embodiment of FIGS. 6A to 6C in other words ensures full symmetry of the device and allows identical conditions for each phase.

Even if the device 1 illustrated in FIG. 6C comprises two air-gaps, a first air-gap 40 between the three magnetic sub-assemblies 30 and the first common yoke 50 and a second air-gap 40' between the three magnetic sub-assemblies 30 and the second common yoke 50', it can comprise only one air-gap, 40 or 40'.

The device 1 has three current inputs connectable to a three phase power line or grid 100 and at least three current outputs for each current input, i.e. at least nine current outputs.

The current outputs are galvanically connected to the three current inputs and can be connected to a load 200. The device 1 transforms three-phase inputs into nine-phase outputs.

When said device is connected between the three phase power grid 100 and a load, for example a non linear load 200 comprising a 18 pulse-rectifier followed by a DC load, the fundamental components of the currents flowing in each of the current outputs are phase shifted of a predetermined angle −20°, 0° and +20° respect to the corresponding fundamental component of the current flowing in the current input.

The juxtaposition of the first and second common yokes on the three magnetic sub-assemblies creates a magnetic connection between these three magnetic sub-assemblies 30 and the presence of at least one air-gap allows the device to perform also an inductor's function. In another embodiment the sub-assemblies are sufficiently close to each other so that the common yokes can be suppressed.

The device 1 allows saving material and has a 20% lower size and weight compared to state-of-the-art eighteen-pulses solutions having the same rated power. The device of the invention uses about one quarter of the materials of a power transformer having the same rated power.

In one embodiment each of the three magnetic sub-assemblies 30 is a laminated iron or for higher frequencies ferromagnetic sub-core.

Cut cores as the C-Cores are strip wound cores, impregnated after annealing, then cut in parts and lapped. Since these cores are assembled around the bobbins in a very short time, the device 1 of this embodiment takes less time to manufacture the device. Also the triangular jokes 50 and 50' illustrated in FIG. 6B can be effectively fabricated with strip-winding techniques.

Figure 7A:
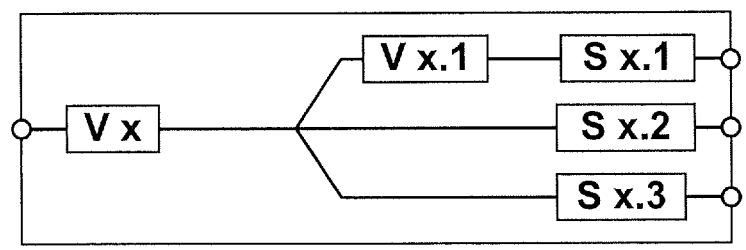
FIGS. 7A, 8A, 9A, 10A, 11A, 12A, 13A, 14A, 15A, and 16A show different possible arrangements of the windings of the magnetic device, according to alternative embodiments of the invention.
Figure 8A:
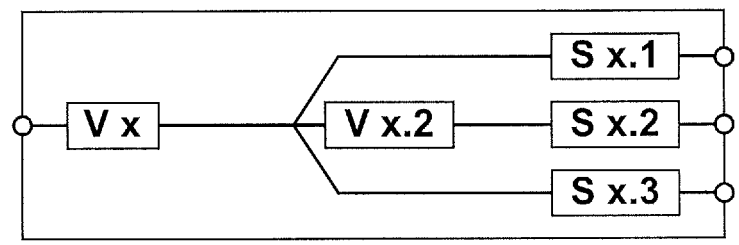
Figure 9A:
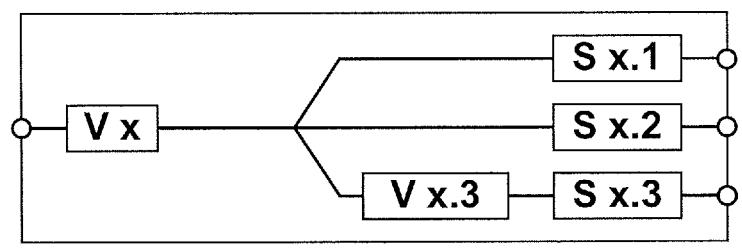
Figure 10A:
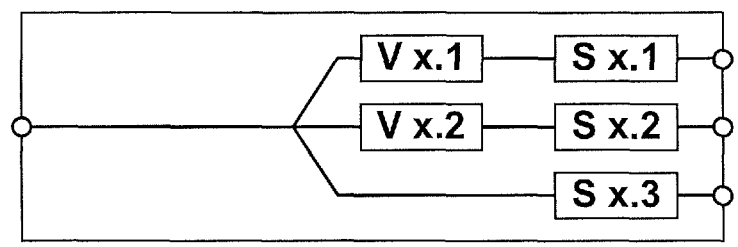
Figure 11A:
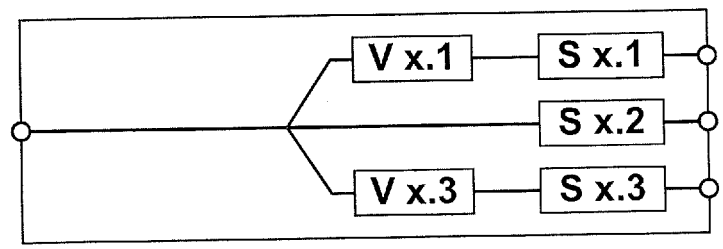
Figure 12A:
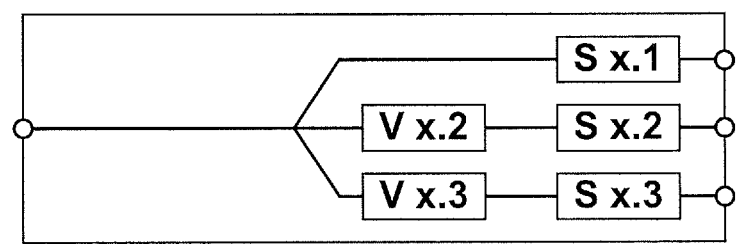
Figure 13A:
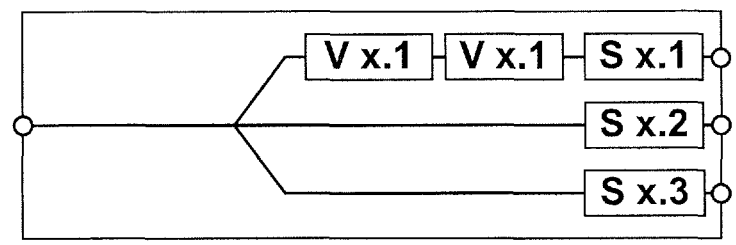
Figure 14A:
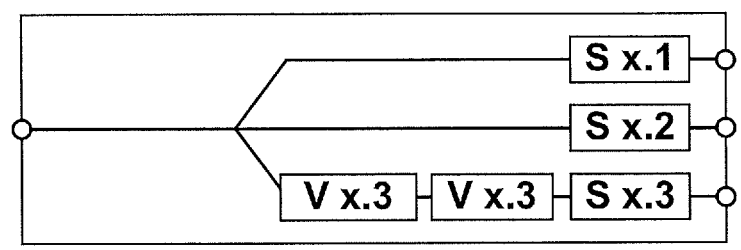

FIG. 7A, 8A, 9A . . . 15A show different arrangements of the windings in one sub-assembly of the magnetic device 1 pertaining to different alternative embodiments of the invention.

FIG. 7B1-7B4, 8B1-8B4, 9B1-9B4 . . . 15B1-15B4 show alternative winding schemes of the three magnetic sub-assemblies of the device 1 relative to the arrangements of FIG. 7A, . . . 15A, together with the corresponding phasor diagrams of MMF vectors. While the phasor diagram represent all the MMF of all the windings in the device 1, the winding scheme relates, for simplicity, to a single magnetic sub-assembly, generally represented in the lowermost position in the phasor diagram. It is worth reminding here that the phasor diagrams of FIGS. 7B1-7B4, . . . 15B1-15B4 represent MMF and not currents and, therefore, the different phasors may have different lengths, because the windings have different turn numbers. The currents presents at the output of the inventive device, however, have all the same amplitude, and would be represented by nine phasors of same length.

In order to have a splitting device as described, the following constraint for each close magnetic circuit has to be satisfied: the sum of the MMFs of this magnetic circuit has to be zero. A MMF related to one winding is the instantaneous value of the current flowing in this winding multiplied by its number of turns. In other words it means that the MMF vectors of a magnetic circuit have to form a close path.

In the embodiment of FIGS. 7A and 7B1-7B4 each magnetic sub-assembly 30 contains five windings: two limbs comprises one split winding S and one spreader winding V, while the remaining limb comprise only one split winding. The name for the windings is explained referring to the phasor diagrams of FIGS. 7B1-7B4, which are representations of the MMF (Magneto-Motive Force) vectors.

Considering for simplicity the arrangement in the top-left corner of FIGS. 7B1-7B4, there is one magnetic circuit for the considered magnetic sub-assembly 30. In this circuit, S1.3 works as a split leading winding, whereas S1.1 is a split lagging winding (because they corresponds to leading, respectively lagging currents) and S1.2 is an in-phase split winding.

V3.1 and V2 are in this case spreader windings because they close the two independent triangular loops made by these five phasors. In particular V3.1 works as a spreader winding for the lagging current and V2 works as a spreader winding for the leading current.

In general each split winding conducts one split current and each spreader winding conducts one phase current, i.e. $I_{L1}$, $I_{L2}$ or $I_{L3}$ or one split currents $I_{S1.1}$, $I_{S1.2}$, $I_{S2.1}$, $I_{S2.2}$, $I_{S3.1}$, $I_{S3.2}$. A spreader winding V can conduct any type of current. In one embodiment the spreader winding V of a limb of the device can conduct a split or common current of another limb of the same device. In another embodiment the spreader winding V can conduct an external and controllable current. FIGS. 7A, 7B1-7B4, 8A, 8B1-8B4, 9A, 9B1-9B4 refer to embodiments in which one spreader winding conducts a phase current, while another spreader winding conducts a split current.

FIGS. 10A to 14B1-14B show another embodiment of the invention, for which both spreader windings conduct a split current.

Figure 15A:
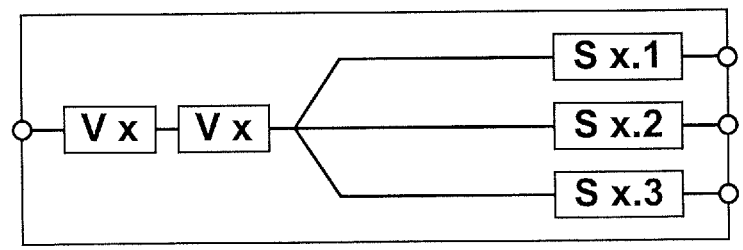
Figure 16A:
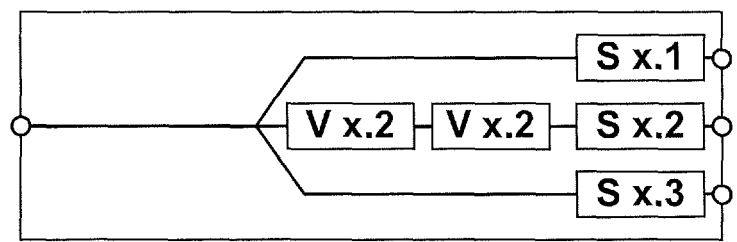

FIGS. 15A to 15B1-15B4 show another embodiment in which both spreader windings conduct a phase current, and FIGS. 16A and 16B illustrate the same, but with both spreader windings conducting a split current.

It appears therefore, that there are several possibilities to arrange and interconnect the windings in the magnetic device of the invention that are not exhausted by the presented figures, that achieve to deliver nine equal currents that have the desired phases to be fed to a 18-pulses rectifier. It must be understood that the present invention is not limited to a particular arrangement, but encompasses all the devices falling in the scope of the appended claims.

The device 1 comprises devices comprising fifteen windings, i.e. five windings for each magnetic sub-assembly 30, two wound limbs having two windings, and the remaining one winding for each wound limb as shown in FIGS. 7A to 16B1-16B4, which illustrate all the possible combinations for the five windings on a magnetic sub-assembly 30.

Figure 3B:
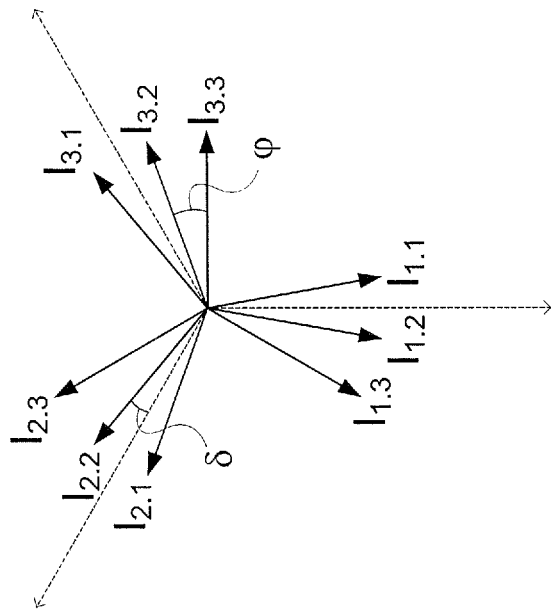
FIG. 3B shows a phasor diagram of the output or split currents, comprising: leading split currents, in-phase split currents, and lagging split currents, of a device of FIG. 2.
Figure 3A:
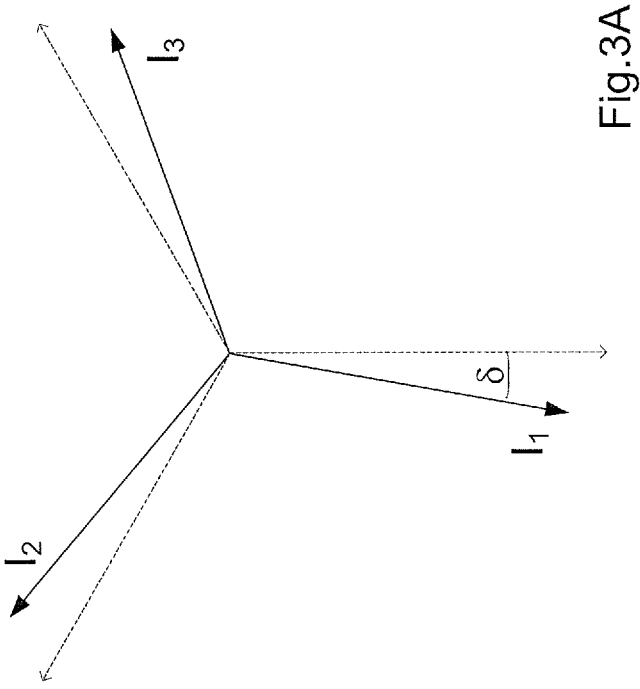
FIG. 3A shows a phasor diagram of the input or common currents of a device of FIG. 2.

Since some energy can be stored in a magnetic field inside the at least one air-gap of the device, or in the space surrounding the device, a lagging angle or phase shift angle δ shown in FIG. 3A between each of the voltage phasors of the power grid 100 and the corresponding input current $I_{L1}$ or $I_{L2}$ or $I_{L3}$ of the magnetic device can be observed. In this case the inductor's function is integrated in the device. Moreover the value of the inductance is easy to control.

The use of the magnetic device 1 in a power converter allows the use of 18-diode rectifier and thus elimination of the $5^{th}$ and $7^{th}$, $11^{th}$ and $13^{th}$, $23^{th}$, and $25^{th}$, $29^{th}$ and $31^{th}$ harmonics. Tests have shown that the Total Harmonic Distortion (THD) can be inferior to about 5%. In the case of a 6-diodes rectifier with a DC link choke for example, harmonics are not eliminated and the THD is not better than 35%.

As shown in the electrical circuits of FIGS. 7A, 8A, . . . , 15A and 16A, the device 1 according to the invention contains three common-paths belonging to phases L1, L2, L3 and nine split-paths. When this device is used in an AC/DC power rectifier and then the current goes from an AC input to a DC output, as described above the device 1 works as a phase shifting current splitter. In fact the current flowing in the common path is split into three or more identical but phase shifted components flowing in the split paths. In another embodiment the number of the split paths can be higher.

Advantageously the device 1 can be used in a DC/AC power converter. In such a case the current goes from a DC input to an AC output and the device 1 works as a phase shifting current merger. In fact the current flowing in the split paths is merged into a common path. Also in this case the number of the split paths can be three or more.

In other words, for each phase of the three input lines connectable to a three phase power grid 100 a phase shifting current splitter/merger device 1 can be used. When this device works as a splitter, it splits an input current into three or more split currents having controllable phase shift and amplitude; when it works as a merger, it combines three or more split currents with controllable phase shift and amplitude into an output current.

Figure 17A:
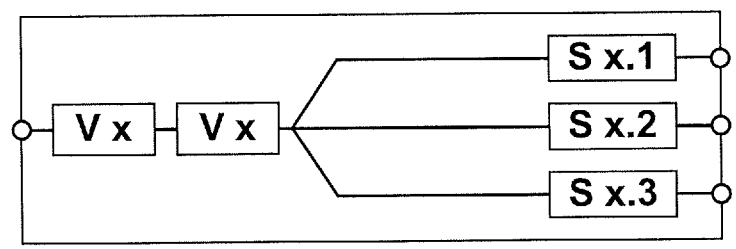
FIGS. 17A, 17B, 17C and 17D illustrate a classification schema of different manners of arranging the windings in the frame of the invention.
Figure 17B:
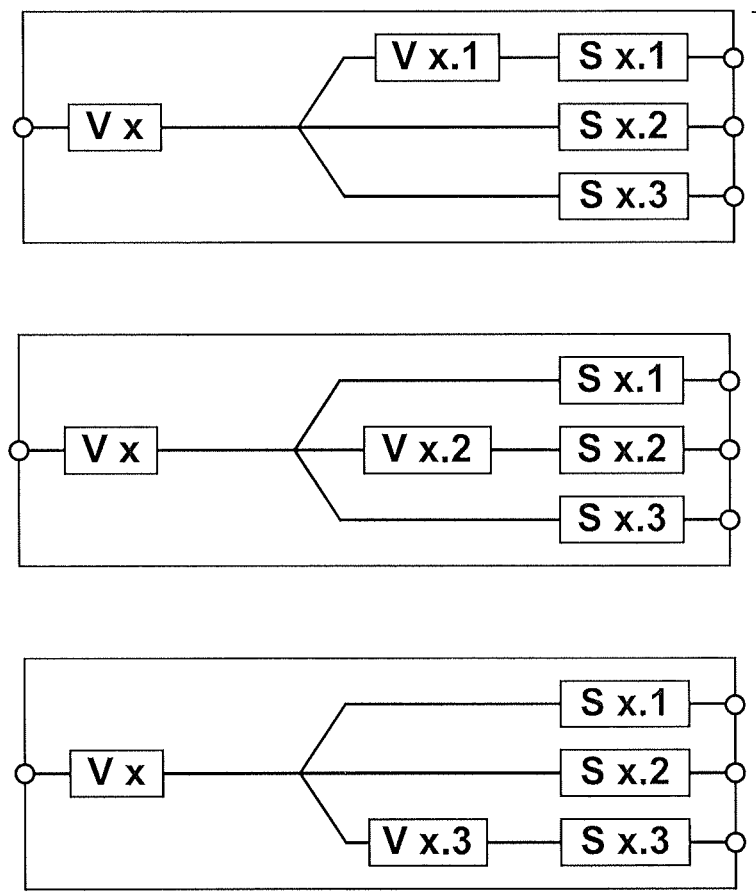
Figure 17C:
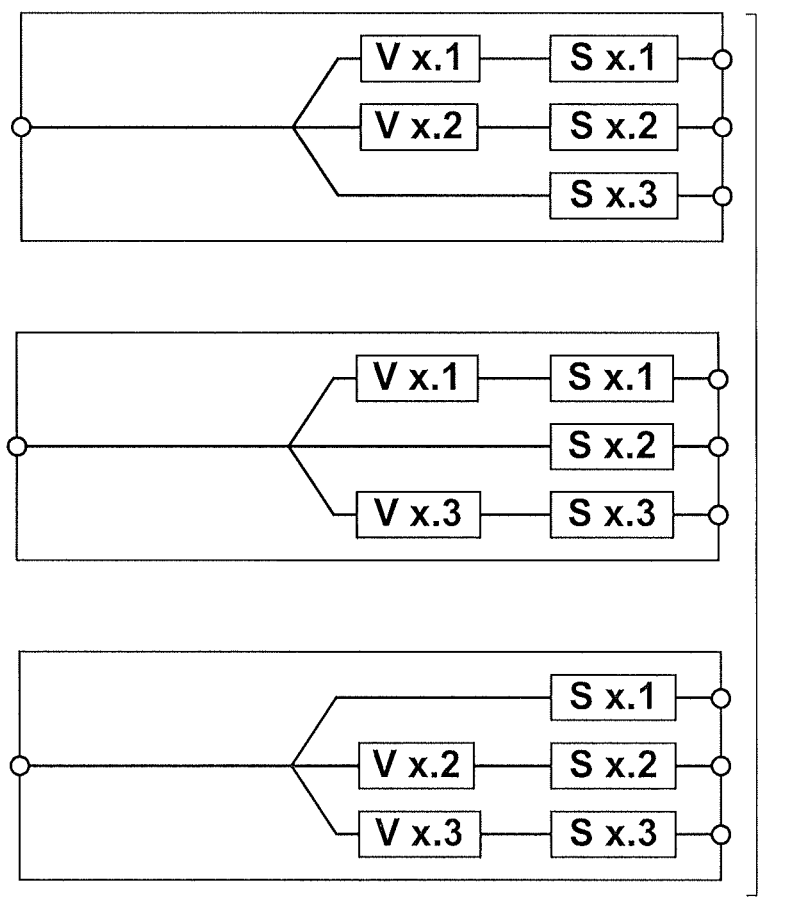
Figure 17D:
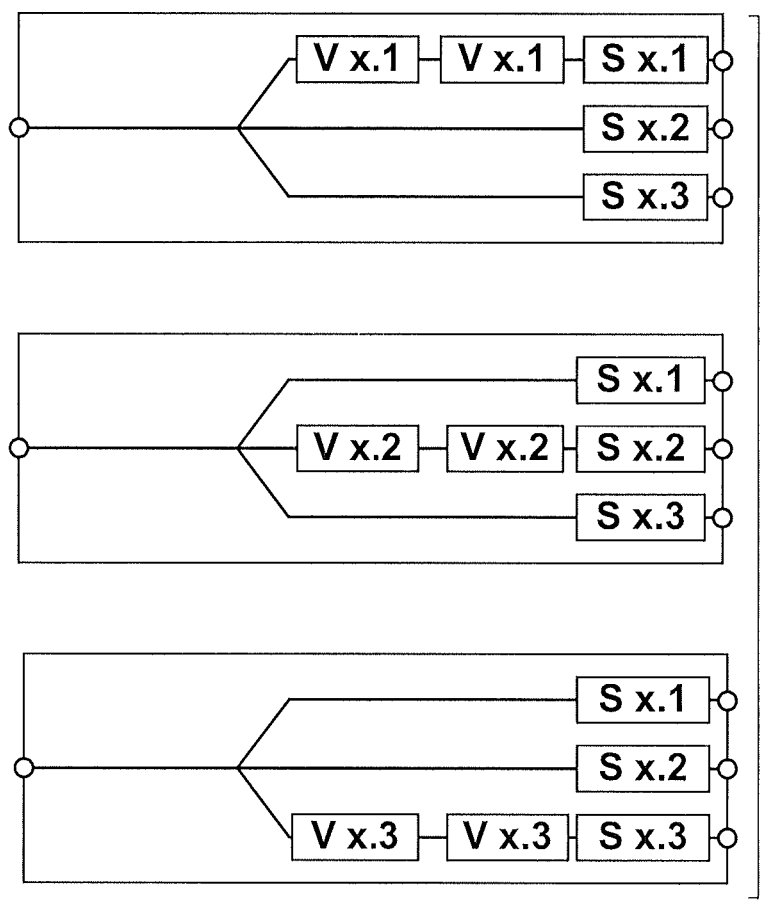

The common path of the device 1 according to the invention can comprise zero (FIGS. 10A to 14A and 16A), one (FIGS. 7A to 9A) or two spreader windings (FIG. 15A). Each split path can comprise one split winding (FIGS. 11A to 12A and 17A to 18A) or one split winding and one or two spreader winding (FIGS. 7A to 10A and 13A to 16A). Depending on the number and the position of windings in the common and split paths, a classification comprising different kinds of device can be built. In some arrangements, namely those of FIGS. 15A and 15B, and 17A, two spreader windings conduct the same common current. In another class, represented by examples of FIGS. 7A to 9A, and 17B, one spreader conducts a phase current, and another spreader conducts a split current. Another category, as seen in FIGS. 10A to 12A and 17C, groups the arrangements in which the spreader conduct two different split currents. Finally, devices in which two spreaders conduct the same split current fall in the last category, which is illustrated in FIGS. 17D and 16A.

The number of turns of windings is selected so that the amplitude of the fundamental frequency component of the split currents flowing in the split paths is identical and the phase shift between the fundamental frequency components of split currents is equal to a predetermined angle. In a preferred embodiment the value of this angle is 0° and ±20°.

Figure 18A:
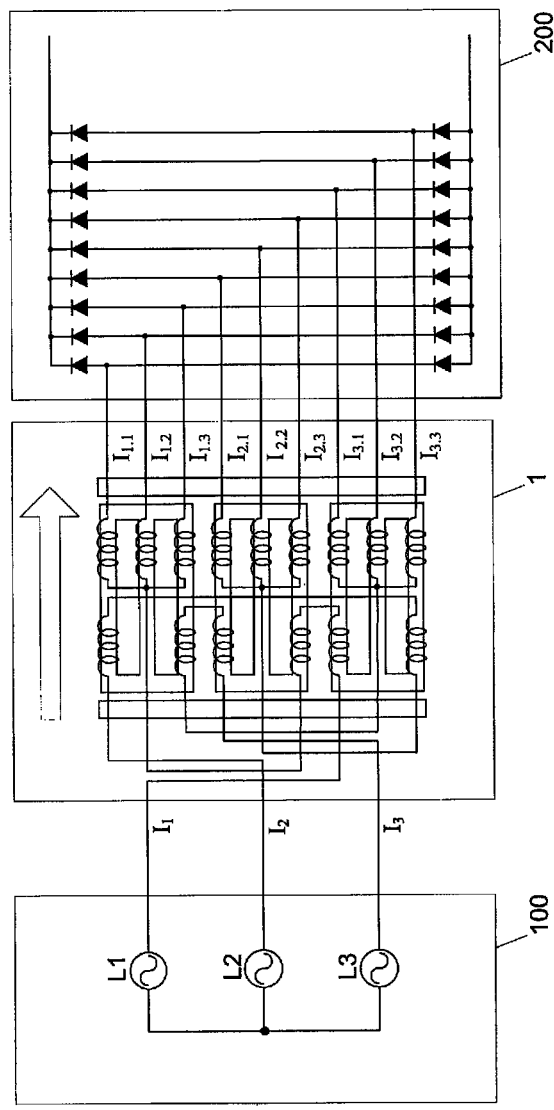
FIG. 18A shows a harmonics cancelling 18-pulse rectifier comprising an example of integrated magnetic device for low harmonics three-phase front-end according to the invention.

FIG. 18A illustrates an AC/DC power rectifier including a magnetic component or device 1 according to one embodiment of the invention.

Since the integrated device 1 is intrinsically inductive, it permits the elimination of the separate inductor 400 of FIG. 1A, further saving material, cost and volume compared to the state of the art.

The device 1 has nine outputs, because it splits each of the three common currents into three split currents. These outputs are sent to 18-diodes rectifier. The outputs of these diodes are combined as shown in FIG. 18A to form a DC output. In this case the value of the phase difference between the three currents flowing in the split paths is equal to 0° and ±20° and then $5^{th}$ and $7^{th}$, $11^{th}$, $13^{th}$, $23^{rd}$, $25^{th}$, $29^{th}$ and $31^{th}$ harmonics are cancelled.

Each magnetic sub-assembly 30 can be considered as belonging to a phase: in the example illustrated in FIG. 18A the first magnetic sub-assembly 30 can be considered as belonging to the phase of L1 because in the current outputs $I_{1.1}$, $I_{1.2}$, $I_{1.3}$ of this magnetic-sub assembly flows split current of L1.

As indicated by the arrow above the device 1 in FIG. 18A the power flow is unidirectional and in particular it goes from AC to DC.

Figure 18C:
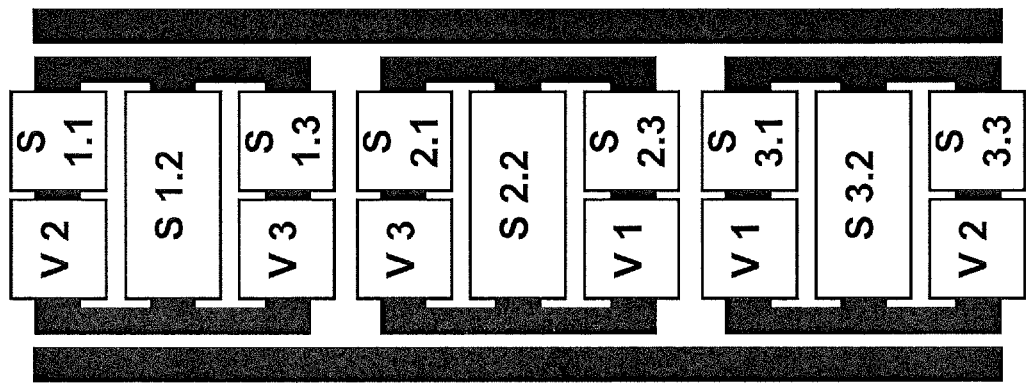
FIGS. 18B and 18C illustrate the MMF phasor diagram and windings' placement for the device illustrated in FIG. 18A.
Figure 18B:
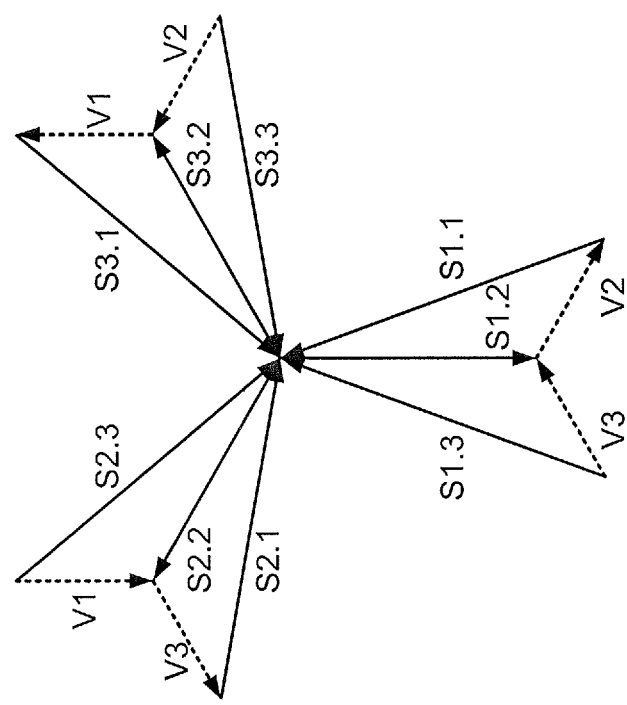

FIGS. 18C and 18B show the winding placement and the resulting MMF phasor diagram of the device 1 in FIG. 18A. It can be appreciated that this structure is the same as in FIG. 15B, rightmost example, with the difference that the whole device 1, rather than a single sub-assembly, is represented in FIG. 18C.

As discussed, the device 1 can be used also as a merger in a DC/AC inverter. As described in such a case the device 1 works as a current merger. The DC/AC converter comprises a 18 or more pulse bridge of controlled switches in parallel to the 18 diodes. In one embodiment these active switches are transistors or Insulated Gate Bipolar Transistors (IGBTs). A driving circuit is arranged to change the status of the active switches.

When the device 1 is used in a DC/AC inverter, it merges three or more split currents into a common phase current.

The device 1 connected between the three phase power grid 100 and a 18-pulse rectifier produces a DC current of a predetermined direction and a DC voltage of a predetermined polarity. If SCR's are used instead of diodes in the 18-pulse rectifier, the DC voltage can change its value and polarity. The resultant phase controlled converter can work as an AC/DC rectifier or DC/AC inverter (two-quadrant converter).

According to an independent aspect of the invention, as indicated by the arrow above the device 1 in FIG. 19 the power flow between the AC and the DC part in a converter can be bidirectional. The reference 700 in fact indicates both power load and source. In such a case each of the diode of the 18-pulse rectifier has a controlled switch in parallel, to form a bidirectional front-end. The control circuit of these switches is not shown.

Such a bidirectional front-end power converter can be advantageously used for a motor of a train, an electric vehicle or a lift with a regenerative brake: some of kinetic energy of a vehicle and/or potential energy (due to elevation) can be converted into a useful form of energy instead of dissipating it as heat as with a conventional resistive brake and the converted energy can be fed back into a power grid for use by other vehicles.

Figure 20:
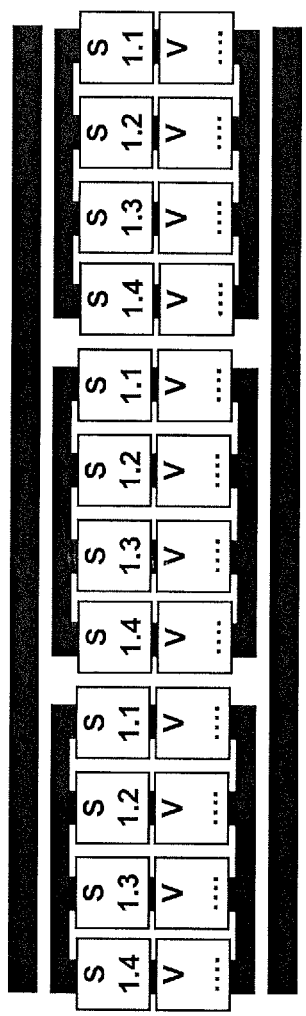
FIG. 20 illustrates a 24-pulses variant of the invention.

Finally, the invention has been described with reference to a 18-pulses system only, for simplicity's sake, but it can be extended to any number of phases by increasing the number of windings and wound limbs accordingly. FIG. 20 shows a variant of the inventive device that has three sub-assemblies, each having eight windings in four wound limbs.

The low harmonics bidirectional front-end power converter comprises
  a three-phase power line 100,
  an integrated magnetic device 1 as described,
  a set of 18 active switches with anti-parallel diodes,
  a DC power source or a DC load 700.

The integrated magnetic device according to the invention can be advantageously used for battery charging or in combination with solar energy panels or in the public lighting context.

The advantages of using such an integrated device are:
  reducing harmonics,
  high reliability,
  low noise, i.e. low EMI,
  high efficiency.

The invention claimed is:

1. An integrated magnetic device for low harmonics three-phase front-end comprising
    three magnetic sub-assemblies, wherein each magnetic sub-assembly comprises a magnetic core without air-gaps, three or more wound limbs and at least five windings,
    at least one first common yoke and a second common yoke which magnetically couple said three magnetic sub-assemblies,
    a first air-gap between said three magnetic sub-assemblies and said at least one first common yoke,
    a second air-gap between said three magnetic sub-assemblies and said at least one second common yoke,
    three current inputs connectable to a three-phase power grid, and
    at least nine current outputs, three for each current inputs, said current outputs being galvanically connected to said three current inputs and connectable to a load.

2. The integrated magnetic device of claim 1, wherein each of said three magnetic sub-assemblies comprises three bobbins assembled on said magnetic core without air-gaps.

3. The integrated magnetic device of claim 1, wherein the sum of the magnetic fluxes entering into said first or second common yokes is zero.

4. The integrated magnetic device of claim 1, wherein said first common yoke and said second common yoke have a triangular or circular or polygonal shape, wherein said three magnetic sub-assemblies are disposed in a triangular or circular or polygonal manner and wherein said device comprises a hole.

5. The integrated magnetic device of claim 1, comprising four ventilation passages.

6. The integrated magnetic device of claim 1, wherein said at least three windings comprise at least three split windings and at least two spreader winding.

7. The integrated magnetic device of claim 1, wherein when said device is connected between said three phase power grid and said load, each fundamental component of the common currents flowing in each of said current inputs is split into three split currents with a predefined phase angle flowing in each of said current outputs and wherein said each fundamental component of the common currents is shifted by a lagging angle from each of the voltage phasors of said three-phase power grid.

8. Use of the integrated magnetic device of claim 1 in an AC/DC rectifier connectable between a power grid and a generic DC load including a 18-pulse rectifier.

9. Use of the integrated magnetic device of claim 1 in a DC/AC inverter including 18-controlled switches.

10. A low harmonics bidirectional three-phase front-end power converter connectable between a three-phase power line and a DC power source or a DC load,
comprising the integrated magnetic device of claim 1 and a set of 18 controlled switches with anti-parallel diodes.

11. An integrated magnetic device for low harmonic three-phase front-end comprising:
three magnetic sub-assemblies, wherein each magnetic sub-assembly comprises a magnetic core without air-gaps, three or more wound limbs and at least five windings, and wherein said three magnetic sub-assemblies are aligned,
at least one first common yoke and a second common yoke which magnetically couple said three magnetic sub-assemblies wherein said first common yoke and said second common yoke have a rectangular shape, and are separate from the magnetic core of the magnetic sub-assemblies,
at least one air-gap between said three magnetic sub-assemblies and said first common yoke or said second common yoke,
three current inputs connectable to a three-phase power grid,
at least nine current outputs, three for each current inputs, said current outputs being galvanically connected to said three current inputs and connectable to a load.

12. An integrated magnetic device for low harmonics three-phase front-end comprising
three magnetic sub-assemblies, wherein each magnetic sub-assembly comprises a magnetic core without air-gaps, three or more wound limbs and at least five windings,
three current inputs connectable to a three-phase power grid,
at least nine current outputs, three for each current inputs, said current outputs being galvanically connected to said three current inputs and connectable to a load, wherein said magnetic-sub-assemblies are magnetically coupled with one another,
at least one first common yoke and a second common yoke which magnetically couple said three magnetic sub-assemblies,
a first air-gap between said three magnetic sub-assemblies and said at least one first common yoke, and
a second air-gap between said three magnetic sub-assemblies and said at least one second common yoke.

13. An integrated magnetic device for low harmonic three-phase front-end comprising:
three magnetic sub-assemblies, wherein each magnetic sub-assembly comprises a magnetic core without air-gaps, three or more wound limbs and at least five windings, three current inputs connectable to a three-phase power grid,
at least nine current outputs, three for each current inputs, said current outputs being galvanically connected to said three current inputs and connectable to a load, wherein said magnetic sub-assemblies are magnetically coupled with one another, at least one first common yoke and a second common yoke which magnetically couple said three magnetic sub-assemblies,
at least one air-gap between said three magnetic sub-assemblies and said first common yoke or said second common yoke,
wherein said first common yoke and said second common yoke have a rectangular shape and are separate from the magnetic core of the magnetic sub-assemblies, and wherein said three magnetic sub-assemblies are aligned.

* * * * *